United States Patent
Krah et al.

(10) Patent No.: US 11,662,867 B1
(45) Date of Patent: May 30, 2023

(54) HOVER DETECTION ON A TOUCH SENSOR PANEL

(71) Applicant: Apple Inc., Cupertino, CA (US)

(72) Inventors: Christoph H. Krah, Cupertino, CA (US); Jesse Michael Devine, Campbell, CA (US); Xiaoqi Zhou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/306,318

(22) Filed: May 3, 2021

Related U.S. Application Data

(60) Provisional application No. 63/032,575, filed on May 30, 2020.

(51) Int. Cl.
 *G06F 3/041* (2006.01)
 *G06F 3/044* (2006.01)
(52) U.S. Cl.
 CPC .......... *G06F 3/0446* (2019.05); *G06F 3/0445* (2019.05)
(58) Field of Classification Search
 CPC ................. G06F 3/0446; G06F 3/0445; G06F 3/041661; G06F 3/0443; G06F 2203/04108
 See application file for complete search history.

(56) References Cited

U.S. PATENT DOCUMENTS

| | | | |
|---|---|---|---|
| 4,087,625 A | 5/1978 | Dym et al. | |
| 4,090,092 A | 5/1978 | Serrano | |
| 4,304,976 A | 12/1981 | Gottbreht et al. | |
| 4,475,235 A | 10/1984 | Graham | |
| 4,550,221 A | 10/1985 | Mabusth | |
| 4,659,874 A | 4/1987 | Landmeier | |
| 5,194,862 A | 3/1993 | Edwards | |
| 5,317,919 A | 6/1994 | Awtrey | |
| 5,459,463 A | 10/1995 | Gruaz et al. | |
| 5,483,261 A | 1/1996 | Yasutake | |

(Continued)

FOREIGN PATENT DOCUMENTS

| | | |
|---|---|---|
| CN | 1202254 A | 12/1998 |
| CN | 1246638 A | 3/2000 |

(Continued)

OTHER PUBLICATIONS

Advisory Action received for U.S. Appl. No. 11/818,498, dated May 17, 2013, 5 pages.

(Continued)

*Primary Examiner* — Md Saiful A Siddiqui
(74) *Attorney, Agent, or Firm* — Kubota & Basol LLP

(57) ABSTRACT

Some touch screens can be formed with rows and columns of touch electrodes. In some examples, during a first time period, a first set of row electrodes are driven while a second set of row electrodes are sensed. In some examples, during a second time period, the first set of row electrodes are sensed while the second set of row electrodes are driven. In some examples, during a third time period, a first set of column electrodes are driven while a second set of column electrodes are sensed. In some examples, during a fourth time period, the first set of column electrodes are sensed while the second set of column electrodes are driven. In some examples, a touch image can be generated based on the data sensed from the first, second, third, and fourth time periods.

17 Claims, 14 Drawing Sheets

(56) References Cited

U.S. PATENT DOCUMENTS

| | | |
|---|---|---|
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,841,427 A | 11/1998 | Teterwak |
| 5,844,506 A | 12/1998 | Binstead |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 5,923,997 A | 7/1999 | Miyanaga et al. |
| 5,973,623 A | 10/1999 | Gupta et al. |
| 6,025,647 A | 2/2000 | Shenoy et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,204,897 B1 | 3/2001 | Colgan et al. |
| 6,239,788 B1 | 5/2001 | Nohno et al. |
| 6,252,825 B1 | 6/2001 | Perotto |
| 6,310,610 B1 | 10/2001 | Beaton et al. |
| 6,323,846 B1 | 11/2001 | Westerman et al. |
| 6,329,044 B1 | 12/2001 | Inoue et al. |
| 6,452,514 B1 | 9/2002 | Philipp |
| 6,456,952 B1 | 9/2002 | Nathan |
| 6,587,358 B1 | 7/2003 | Yasumura |
| 6,690,387 B2 | 2/2004 | Zimmerman et al. |
| 6,690,569 B1 | 2/2004 | Mayer et al. |
| 6,730,863 B2 | 5/2004 | Gerpheide et al. |
| 6,844,673 B1 | 1/2005 | Bernkopf |
| 6,847,354 B2 | 1/2005 | Vranish |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,026 B2 | 2/2007 | Gordon et al. |
| 7,184,064 B2 | 2/2007 | Zimmerman et al. |
| 7,337,085 B2 | 2/2008 | Soss |
| 7,395,717 B2 | 7/2008 | Deangelis et al. |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,580,030 B2 | 8/2009 | Marten |
| 7,639,234 B2 | 12/2009 | Orsley |
| 7,663,607 B2 | 2/2010 | Hotelling et al. |
| 7,701,539 B2 | 4/2010 | Shih et al. |
| 7,719,523 B2 | 5/2010 | Hillis |
| 7,864,503 B2 | 1/2011 | Chang |
| 7,898,122 B2 | 3/2011 | Andrieux et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,142 B1 | 10/2011 | Bokma et al. |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,059,103 B2 | 11/2011 | Geaghan |
| 8,068,097 B2 | 11/2011 | Guanghai |
| 8,120,371 B2 | 2/2012 | Day et al. |
| 8,125,312 B2 | 2/2012 | Orr |
| 8,149,002 B2 | 4/2012 | Ossart et al. |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,264,428 B2 | 9/2012 | Nam |
| 8,283,935 B2 | 10/2012 | Liu et al. |
| 8,300,021 B2 | 10/2012 | Ayres et al. |
| 8,319,747 B2 | 11/2012 | Hotelling et al. |
| 8,339,286 B2 | 12/2012 | Cordeiro |
| 8,355,887 B1 | 1/2013 | Harding et al. |
| 8,390,573 B2 | 3/2013 | Trout |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,525,756 B2 | 9/2013 | Kwon |
| 8,537,126 B2 | 9/2013 | Yousefpor et al. |
| 8,542,208 B2 | 9/2013 | Krah et al. |
| 8,552,994 B2 | 10/2013 | Simmons |
| 8,576,193 B2 | 11/2013 | Hotelling |
| 8,593,410 B2 | 11/2013 | Hong et al. |
| 8,593,425 B2 | 11/2013 | Hong et al. |
| 8,614,688 B2 | 12/2013 | Chang |
| 8,633,915 B2 | 1/2014 | Hotelling et al. |
| 8,665,237 B2 | 3/2014 | Koshiyama et al. |
| 8,680,877 B2 | 3/2014 | Lee et al. |
| 8,760,412 B2 | 6/2014 | Hotelling et al. |
| 8,766,950 B1 | 7/2014 | Morein et al. |
| 8,773,146 B1 | 7/2014 | Hills et al. |
| 8,773,351 B2 | 7/2014 | Rekimoto |
| 8,810,524 B1 | 8/2014 | Rosenberg et al. |
| 8,810,543 B1 | 8/2014 | Kurikawa |
| 8,884,917 B2 | 11/2014 | Seo |
| 8,902,172 B2 | 12/2014 | Peng et al. |
| 8,917,256 B2 | 12/2014 | Roziere |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo et al. |
| 9,000,782 B2 | 4/2015 | Roziere |
| 9,001,082 B1 | 4/2015 | Rosenberg et al. |
| 9,024,913 B1 | 5/2015 | Jung et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,151,791 B2 | 10/2015 | Roziere |
| 9,164,137 B2 | 10/2015 | Page et al. |
| 9,189,119 B2 | 11/2015 | Liao et al. |
| 9,250,757 B2 | 2/2016 | Roziere |
| 9,261,997 B2 | 2/2016 | Chang et al. |
| 9,268,427 B2 | 2/2016 | Yousefpor et al. |
| 9,280,251 B2 | 3/2016 | Shih |
| 9,292,137 B2 | 3/2016 | Kogo |
| 9,317,165 B2 | 4/2016 | Hotelling et al. |
| 9,329,674 B2 | 5/2016 | Lee et al. |
| 9,329,723 B2 | 5/2016 | Benbasat et al. |
| 9,372,576 B2 | 6/2016 | Westerman |
| 9,423,897 B2 | 8/2016 | Bae |
| 9,442,330 B2 | 9/2016 | Huo |
| 9,448,675 B2 | 9/2016 | Morein et al. |
| 9,448,677 B2 | 9/2016 | Beilker |
| 9,535,547 B2 | 1/2017 | Roziere |
| 9,582,131 B2 | 2/2017 | Elias |
| 9,640,991 B2 | 5/2017 | Blondin et al. |
| 9,690,397 B2 | 6/2017 | Shepelev et al. |
| 9,740,351 B2 | 8/2017 | Li et al. |
| 9,785,295 B2 | 10/2017 | Yang et al. |
| 9,804,717 B2 | 10/2017 | Schropp, Jr. |
| 9,857,925 B2 | 1/2018 | Morein et al. |
| 9,874,975 B2 | 1/2018 | Benbasat et al. |
| 9,880,655 B2 | 1/2018 | O'connor |
| 9,886,141 B2 | 2/2018 | Yousefpor |
| 9,898,149 B2 | 2/2018 | Kang et al. |
| 9,904,427 B1 | 2/2018 | Co et al. |
| 9,996,175 B2 | 6/2018 | Hotelling et al. |
| 10,001,888 B2 | 6/2018 | Hong et al. |
| 10,061,433 B2 | 8/2018 | Imai et al. |
| 10,073,562 B2 | 9/2018 | Mo et al. |
| 10,120,520 B2 | 11/2018 | Krah et al. |
| 10,175,832 B2 | 1/2019 | Roziere |
| 10,254,896 B2 | 4/2019 | Mori et al. |
| 10,289,251 B2 | 5/2019 | Shih et al. |
| 10,331,278 B2 | 6/2019 | Hotelling et al. |
| 10,365,764 B2 | 7/2019 | Korapati et al. |

(56) References Cited

U.S. PATENT DOCUMENTS

| | | |
|---|---|---|
| 10,386,962 B1 | 8/2019 | Jin et al. |
| 10,459,587 B2 | 10/2019 | Krah et al. |
| 10,534,481 B2 | 1/2020 | Badaye et al. |
| 10,705,658 B2 | 7/2020 | Li et al. |
| 10,725,591 B1 | 7/2020 | Maharyta et al. |
| 11,157,109 B1 | 10/2021 | Shorten et al. |
| 2002/0015024 A1 | 2/2002 | Westerman et al. |
| 2002/0152048 A1 | 10/2002 | Hayes |
| 2003/0075427 A1 | 4/2003 | Caldwell |
| 2003/0076325 A1 | 4/2003 | Thrasher |
| 2003/0164820 A1 | 9/2003 | Kent |
| 2003/0210235 A1 | 11/2003 | Roberts |
| 2003/0234768 A1 | 12/2003 | Rekimoto et al. |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0113819 A1 | 6/2004 | Gauthey et al. |
| 2004/0119701 A1 | 6/2004 | Mulligan et al. |
| 2004/0125087 A1 | 7/2004 | Taylor et al. |
| 2004/0140993 A1 | 7/2004 | Geaghan et al. |
| 2004/0188151 A1 | 9/2004 | Gerpheide et al. |
| 2004/0189617 A1 | 9/2004 | Gerpheide et al. |
| 2004/0212586 A1 | 10/2004 | Denny |
| 2004/0239650 A1 | 12/2004 | Mackey |
| 2004/0241920 A1 | 12/2004 | Hsiao et al. |
| 2004/0243747 A1 | 12/2004 | Rekimoto |
| 2005/0007353 A1 | 1/2005 | Smith et al. |
| 2005/0012724 A1 | 1/2005 | Kent |
| 2005/0069718 A1 | 3/2005 | Voss-kehl et al. |
| 2005/0073507 A1 | 4/2005 | Richter et al. |
| 2005/0083307 A1 | 4/2005 | Aufderheide et al. |
| 2005/0104867 A1 | 5/2005 | Westerman et al. |
| 2005/0126831 A1 | 6/2005 | Richter et al. |
| 2005/0146509 A1 | 7/2005 | Geaghan et al. |
| 2005/0219228 A1 | 10/2005 | Alameh et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0026521 A1 | 2/2006 | Hotelling et al. |
| 2006/0038791 A1 | 2/2006 | Mackey |
| 2006/0097991 A1 | 5/2006 | Hotelling et al. |
| 2006/0097992 A1 | 5/2006 | Gitzinger et al. |
| 2006/0132463 A1 | 6/2006 | Lee et al. |
| 2006/0146484 A1 | 7/2006 | Kim et al. |
| 2006/0161871 A1 | 7/2006 | Hotelling et al. |
| 2006/0197753 A1 | 9/2006 | Hotelling |
| 2006/0202969 A1 | 9/2006 | Hauck |
| 2006/0203403 A1 | 9/2006 | Schediwy et al. |
| 2006/0227115 A1 | 10/2006 | Fry |
| 2006/0238522 A1 | 10/2006 | Westerman et al. |
| 2006/0248208 A1 | 11/2006 | Walbeck et al. |
| 2006/0256090 A1 | 11/2006 | Huppi |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0284639 A1 | 12/2006 | Reynolds |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0191070 A1 | 8/2007 | Rao |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp et al. |
| 2007/0279619 A1 | 12/2007 | Chang |
| 2007/0283832 A1 | 12/2007 | Hotelling |
| 2007/0285365 A1 | 12/2007 | Lee |
| 2007/0296709 A1 | 12/2007 | Guanghai |
| 2008/0006454 A1 | 1/2008 | Hotelling |
| 2008/0007533 A1 | 1/2008 | Hotelling |
| 2008/0012835 A1 | 1/2008 | Rimon et al. |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042985 A1 | 2/2008 | Katsuhito et al. |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0061800 A1 | 3/2008 | Reynolds et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0100572 A1 | 5/2008 | Boillot |
| 2008/0136787 A1 | 6/2008 | Yeh et al. |
| 2008/0136792 A1 | 6/2008 | Peng et al. |
| 2008/0142281 A1 | 6/2008 | Geaghan |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0174321 A1 | 7/2008 | Kang et al. |
| 2008/0180365 A1 | 7/2008 | Ozaki |
| 2008/0188267 A1 | 8/2008 | Sagong |
| 2008/0224962 A1 | 9/2008 | Kasai et al. |
| 2008/0231292 A1 | 9/2008 | Ossart et al. |
| 2008/0238871 A1 | 10/2008 | Tam |
| 2008/0238879 A1 | 10/2008 | Jaeger et al. |
| 2008/0246496 A1 | 10/2008 | Hristov et al. |
| 2008/0252608 A1 | 10/2008 | Geaghan |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0009485 A1 | 1/2009 | Bytheway |
| 2009/0019344 A1 | 1/2009 | Yoon et al. |
| 2009/0020343 A1 | 1/2009 | Rothkopf et al. |
| 2009/0054107 A1 | 2/2009 | Feland et al. |
| 2009/0059730 A1 | 3/2009 | Lyons et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091546 A1 | 4/2009 | Joo et al. |
| 2009/0091551 A1 | 4/2009 | Hotelling et al. |
| 2009/0109192 A1 | 4/2009 | Liu et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0141046 A1 | 6/2009 | Rathnam et al. |
| 2009/0146970 A1 | 6/2009 | Lowles et al. |
| 2009/0160787 A1 | 6/2009 | Westerman et al. |
| 2009/0174676 A1 | 7/2009 | Westerman |
| 2009/0174688 A1 | 7/2009 | Westerman |
| 2009/0179868 A1 | 7/2009 | Ayres et al. |
| 2009/0182189 A1 | 7/2009 | Lira |
| 2009/0184937 A1 | 7/2009 | Grivna |

(56) References Cited

U.S. PATENT DOCUMENTS

| | | |
|---|---|---|
| 2009/0194344 A1 | 8/2009 | Harley et al. |
| 2009/0205879 A1 | 8/2009 | Halsey et al. |
| 2009/0212642 A1 | 8/2009 | Krah |
| 2009/0213090 A1 | 8/2009 | Mamba et al. |
| 2009/0236151 A1 | 9/2009 | Yeh et al. |
| 2009/0238012 A1 | 9/2009 | Tatapudi et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0267916 A1 | 10/2009 | Hotelling |
| 2009/0273577 A1 | 11/2009 | Chen et al. |
| 2009/0277695 A1 | 11/2009 | Liu et al. |
| 2009/0303189 A1 | 12/2009 | Grunthaner et al. |
| 2009/0309850 A1 | 12/2009 | Yang |
| 2009/0309851 A1 | 12/2009 | Bernstein |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0004029 A1 | 1/2010 | Kim |
| 2010/0006350 A1 | 1/2010 | Elias |
| 2010/0007616 A1 | 1/2010 | Jang |
| 2010/0013745 A1 | 1/2010 | Kim et al. |
| 2010/0013791 A1 | 1/2010 | Haga et al. |
| 2010/0019779 A1 | 1/2010 | Kato et al. |
| 2010/0031174 A1 | 2/2010 | Kim |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0090964 A1 | 4/2010 | Soo et al. |
| 2010/0097346 A1 | 4/2010 | Sleeman |
| 2010/0102027 A1 | 4/2010 | Liu et al. |
| 2010/0110035 A1 | 5/2010 | Selker |
| 2010/0117985 A1 | 5/2010 | Wadia |
| 2010/0123667 A1 | 5/2010 | Kim et al. |
| 2010/0139991 A1 | 6/2010 | Philipp et al. |
| 2010/0143848 A1 | 6/2010 | Jain et al. |
| 2010/0149108 A1 | 6/2010 | Hotelling et al. |
| 2010/0149127 A1 | 6/2010 | Fisher et al. |
| 2010/0156810 A1 | 6/2010 | Barbier et al. |
| 2010/0156846 A1 | 6/2010 | Long et al. |
| 2010/0182018 A1 | 7/2010 | Hazelden |
| 2010/0182278 A1 | 7/2010 | Li et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0194707 A1 | 8/2010 | Hotelling et al. |
| 2010/0201635 A1 | 8/2010 | Klinghult et al. |
| 2010/0245286 A1 | 9/2010 | Parker |
| 2010/0253638 A1 | 10/2010 | Yousefpor et al. |
| 2010/0259503 A1 | 10/2010 | Yanase et al. |
| 2010/0265187 A1 | 10/2010 | Chang et al. |
| 2010/0265188 A1 | 10/2010 | Chang et al. |
| 2010/0277418 A1 | 11/2010 | Huang et al. |
| 2010/0321305 A1 | 12/2010 | Chang et al. |
| 2010/0328228 A1 | 12/2010 | Elias |
| 2010/0328248 A1 | 12/2010 | Mozdzyn |
| 2010/0328262 A1 | 12/2010 | Huang et al. |
| 2010/0328263 A1 | 12/2010 | Lin |
| 2011/0001491 A1 | 1/2011 | Huang et al. |
| 2011/0006832 A1 | 1/2011 | Land et al. |
| 2011/0006999 A1 | 1/2011 | Chang et al. |
| 2011/0007020 A1 | 1/2011 | Hong et al. |
| 2011/0007021 A1 | 1/2011 | Bernstein et al. |
| 2011/0007030 A1 | 1/2011 | Mo et al. |
| 2011/0025623 A1 | 2/2011 | Lin |
| 2011/0025629 A1 | 2/2011 | Grivna et al. |
| 2011/0025635 A1 | 2/2011 | Lee |
| 2011/0057899 A1 | 3/2011 | Sleeman et al. |
| 2011/0061949 A1 | 3/2011 | Krah et al. |
| 2011/0074705 A1 | 3/2011 | Yousefpor et al. |
| 2011/0080391 A1 | 4/2011 | Brown et al. |
| 2011/0096016 A1 | 4/2011 | Yilmaz |
| 2011/0134050 A1 | 6/2011 | Harley |
| 2011/0157068 A1 | 6/2011 | Parker et al. |
| 2011/0157093 A1 | 6/2011 | Bita et al. |
| 2011/0169783 A1 | 7/2011 | Wang et al. |
| 2011/0175846 A1 | 7/2011 | Wang et al. |
| 2011/0193776 A1 | 8/2011 | Oda et al. |
| 2011/0199105 A1 | 8/2011 | Otagaki et al. |
| 2011/0210941 A1 | 9/2011 | Reynolds et al. |
| 2011/0227874 A1 | 9/2011 | Fahraeus et al. |
| 2011/0231139 A1 | 9/2011 | Yokota et al. |
| 2011/0234523 A1 | 9/2011 | Chang et al. |
| 2011/0234526 A1 | 9/2011 | Mi |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin et al. |
| 2012/0050216 A1 | 3/2012 | Kremin et al. |
| 2012/0050217 A1 | 3/2012 | Noguchi et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0132006 A1 | 5/2012 | Roziere |
| 2012/0146726 A1 | 6/2012 | Huang et al. |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0187965 A1 | 7/2012 | Roziere |
| 2012/0188200 A1 | 7/2012 | Roziere |
| 2012/0188201 A1 | 7/2012 | Binstead |
| 2012/0211264 A1 | 8/2012 | Milne |
| 2012/0242597 A1 | 9/2012 | Hwang et al. |
| 2012/0249401 A1 | 10/2012 | Omoto |
| 2012/0249446 A1 | 10/2012 | Chen et al. |
| 2012/0262395 A1 | 10/2012 | Chan |
| 2012/0262410 A1 | 10/2012 | Lim |
| 2012/0274603 A1 | 11/2012 | Kim et al. |
| 2012/0287068 A1 | 11/2012 | Colgate et al. |
| 2012/0313881 A1 | 12/2012 | Ge et al. |
| 2012/0320385 A1 | 12/2012 | Mu et al. |
| 2013/0015868 A1 | 1/2013 | Peng |
| 2013/0016612 A1 | 1/2013 | Vasseur et al. |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang et al. |
| 2013/0057511 A1 | 3/2013 | Shepelev et al. |
| 2013/0069911 A1 | 3/2013 | You |
| 2013/0076647 A1 | 3/2013 | Yousefpor et al. |
| 2013/0076648 A1 | 3/2013 | Krah et al. |
| 2013/0078945 A1 | 3/2013 | Lavi et al. |
| 2013/0093712 A1 | 4/2013 | Liu et al. |
| 2013/0100038 A1 | 4/2013 | Yilmaz et al. |
| 2013/0100071 A1 | 4/2013 | Wright et al. |
| 2013/0120303 A1 | 5/2013 | Hong et al. |
| 2013/0127739 A1 | 5/2013 | Guard et al. |

(56) References Cited

U.S. PATENT DOCUMENTS

| | | |
|---|---|---|
| 2013/0141343 A1 | 6/2013 | Yu et al. |
| 2013/0141383 A1 | 6/2013 | Woolley |
| 2013/0154996 A1 | 6/2013 | Trend et al. |
| 2013/0170116 A1 | 7/2013 | In et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0176276 A1 | 7/2013 | Shepelev |
| 2013/0181943 A1 | 7/2013 | Bulea et al. |
| 2013/0194229 A1 | 8/2013 | Sabo et al. |
| 2013/0215049 A1* | 8/2013 | Lee .................. G06F 3/041 345/173 |
| 2013/0215075 A1 | 8/2013 | Lee et al. |
| 2013/0224370 A1 | 8/2013 | Cok et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0257798 A1 | 10/2013 | Tamura et al. |
| 2013/0265276 A1 | 10/2013 | Obeidat et al. |
| 2013/0271427 A1 | 10/2013 | Benbasat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1 | 10/2013 | Hsu et al. |
| 2013/0285971 A1 | 10/2013 | Elias et al. |
| 2013/0293499 A1 | 11/2013 | Chang et al. |
| 2013/0307821 A1 | 11/2013 | Kogo |
| 2013/0308031 A1 | 11/2013 | Theuwissen |
| 2013/0314342 A1 | 11/2013 | Kim et al. |
| 2013/0320994 A1 | 12/2013 | Brittain et al. |
| 2013/0321289 A1 | 12/2013 | Dubery et al. |
| 2013/0328759 A1 | 12/2013 | Al-dahle et al. |
| 2013/0335342 A1 | 12/2013 | Kim et al. |
| 2013/0342479 A1 | 12/2013 | Pyo et al. |
| 2014/0002406 A1 | 1/2014 | Cormier, Jr. et al. |
| 2014/0009438 A1 | 1/2014 | Liu et al. |
| 2014/0022186 A1 | 1/2014 | Hong et al. |
| 2014/0022201 A1 | 1/2014 | Boychuk et al. |
| 2014/0043546 A1 | 2/2014 | Yamazaki et al. |
| 2014/0049507 A1 | 2/2014 | Shepelev et al. |
| 2014/0070823 A1 | 3/2014 | Roziere |
| 2014/0071084 A1 | 3/2014 | Sugiura |
| 2014/0078096 A1 | 3/2014 | Tan et al. |
| 2014/0078097 A1 | 3/2014 | Shepelev et al. |
| 2014/0098051 A1 | 4/2014 | Hong et al. |
| 2014/0103712 A1 | 4/2014 | Blondin et al. |
| 2014/0104194 A1 | 4/2014 | Davidson et al. |
| 2014/0104223 A1 | 4/2014 | Hanssen et al. |
| 2014/0104225 A1 | 4/2014 | Davidson et al. |
| 2014/0104228 A1 | 4/2014 | Chen et al. |
| 2014/0111496 A1 | 4/2014 | Gomez et al. |
| 2014/0111707 A1 | 4/2014 | Song et al. |
| 2014/0118270 A1 | 5/2014 | Moses et al. |
| 2014/0125357 A1 | 5/2014 | Blondin et al. |
| 2014/0125628 A1 | 5/2014 | Yoshida et al. |
| 2014/0132534 A1 | 5/2014 | Kim |
| 2014/0132560 A1 | 5/2014 | Huang et al. |
| 2014/0132860 A1 | 5/2014 | Hotelling et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0160376 A1 | 6/2014 | Wang et al. |
| 2014/0168540 A1 | 6/2014 | Wang et al. |
| 2014/0180481 A1 | 6/2014 | Park et al. |
| 2014/0192027 A1 | 7/2014 | Ksondzyk et al. |
| 2014/0204043 A1 | 7/2014 | Lin et al. |
| 2014/0204058 A1 | 7/2014 | Huang et al. |
| 2014/0210779 A1 | 7/2014 | Katsuta et al. |
| 2014/0210784 A1 | 7/2014 | Gourevitch et al. |
| 2014/0225838 A1 | 8/2014 | Gupta et al. |
| 2014/0232681 A1 | 8/2014 | Yeh |
| 2014/0232955 A1 | 8/2014 | Roudbari et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267128 A1 | 9/2014 | Bulea et al. |
| 2014/0267146 A1 | 9/2014 | Chang et al. |
| 2014/0267165 A1 | 9/2014 | Roziere |
| 2014/0285469 A1 | 9/2014 | Wright et al. |
| 2014/0306924 A1 | 10/2014 | Lin et al. |
| 2014/0327644 A1 | 11/2014 | Mohindra |
| 2014/0333582 A1 | 11/2014 | Huo |
| 2014/0347321 A1 | 11/2014 | Roziere |
| 2014/0347574 A1 | 11/2014 | Tung et al. |
| 2014/0354301 A1 | 12/2014 | Trend |
| 2014/0362029 A1 | 12/2014 | Mo et al. |
| 2014/0362030 A1 | 12/2014 | Mo et al. |
| 2014/0362034 A1 | 12/2014 | Mo et al. |
| 2014/0362036 A1 | 12/2014 | Mo et al. |
| 2014/0368436 A1 | 12/2014 | Abzarian et al. |
| 2014/0368460 A1 | 12/2014 | Mo et al. |
| 2014/0375598 A1* | 12/2014 | Shen .................. G06F 3/0446 345/174 |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0002752 A1 | 1/2015 | Shepelev et al. |
| 2015/0009421 A1 | 1/2015 | Choi et al. |
| 2015/0015528 A1 | 1/2015 | Vandermeijden |
| 2015/0026398 A1 | 1/2015 | Kim |
| 2015/0035768 A1 | 2/2015 | Shahparnia et al. |
| 2015/0035787 A1 | 2/2015 | Shahparnia et al. |
| 2015/0035797 A1 | 2/2015 | Shahparnia |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1* | 2/2015 | Yousefpor ........... G06F 3/04186 345/174 |
| 2015/0062063 A1 | 3/2015 | Cheng et al. |
| 2015/0077375 A1 | 3/2015 | Hotelling et al. |
| 2015/0077394 A1 | 3/2015 | Dai et al. |
| 2015/0084911 A1 | 3/2015 | Stronks et al. |
| 2015/0091587 A1 | 4/2015 | Shepelev et al. |
| 2015/0091843 A1 | 4/2015 | Ludden |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0167177 A1 | 6/2015 | Choi |
| 2015/0194470 A1 | 7/2015 | Hwang |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0248180 A1* | 9/2015 | Wakuda .............. G06F 3/0446 200/600 |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0277648 A1 | 10/2015 | Small |
| 2015/0309610 A1 | 10/2015 | Rabii et al. |
| 2015/0324035 A1 | 11/2015 | Yuan et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0011702 A1 | 1/2016 | Shih |
| 2016/0018348 A1 | 1/2016 | Yau et al. |
| 2016/0018867 A1 | 1/2016 | Nys et al. |
| 2016/0022218 A1 | 1/2016 | Hayes et al. |
| 2016/0034102 A1 | 2/2016 | Roziere et al. |
| 2016/0041629 A1 | 2/2016 | Rao et al. |
| 2016/0048234 A1 | 2/2016 | Chandran et al. |
| 2016/0062533 A1 | 3/2016 | O'connor |
| 2016/0077667 A1 | 3/2016 | Chiang et al. |
| 2016/0098114 A1 | 4/2016 | Pylvas |
| 2016/0117017 A1 | 4/2016 | Kremin et al. |
| 2016/0117032 A1 | 4/2016 | Lin et al. |
| 2016/0139728 A1 | 5/2016 | Jeon et al. |
| 2016/0154505 A1 | 6/2016 | Chang et al. |
| 2016/0154529 A1 | 6/2016 | Westerman |
| 2016/0170533 A1 | 6/2016 | Roziere |
| 2016/0188040 A1 | 6/2016 | Shin et al. |

(56) References Cited

U.S. PATENT DOCUMENTS

| | | | |
|---|---|---|---|
| 2016/0195954 A1 | 7/2016 | Wang et al. | |
| 2016/0209953 A1* | 7/2016 | Kim | G09G 5/003 |
| 2016/0211808 A1 | 7/2016 | Lee et al. | |
| 2016/0216801 A1 | 7/2016 | Shedletsky et al. | |
| 2016/0216808 A1 | 7/2016 | Hotelling et al. | |
| 2016/0224177 A1 | 8/2016 | Krah | |
| 2016/0224189 A1 | 8/2016 | Yousefpor et al. | |
| 2016/0246403 A1 | 8/2016 | Zhao et al. | |
| 2016/0246423 A1 | 8/2016 | Fu | |
| 2016/0253034 A1 | 9/2016 | Gupta et al. | |
| 2016/0253041 A1 | 9/2016 | Park et al. | |
| 2016/0259448 A1 | 9/2016 | Guarneri | |
| 2016/0266676 A1 | 9/2016 | Wang et al. | |
| 2016/0266679 A1 | 9/2016 | Shahparnia et al. | |
| 2016/0282980 A1 | 9/2016 | Chintalapoodi et al. | |
| 2016/0283023 A1 | 9/2016 | Shin et al. | |
| 2016/0299603 A1 | 10/2016 | Tsujioka et al. | |
| 2016/0320898 A1 | 11/2016 | Tang et al. | |
| 2016/0357344 A1 | 12/2016 | Benbasat et al. | |
| 2017/0060318 A1 | 3/2017 | Gu et al. | |
| 2017/0090599 A1 | 3/2017 | Kuboyama et al. | |
| 2017/0090619 A1 | 3/2017 | Yousefpor et al. | |
| 2017/0090622 A1 | 3/2017 | Badaye et al. | |
| 2017/0090644 A1 | 3/2017 | Yao et al. | |
| 2017/0097703 A1 | 4/2017 | Lee | |
| 2017/0108968 A1 | 4/2017 | Roziere | |
| 2017/0139539 A1 | 5/2017 | Yao et al. | |
| 2017/0168619 A1 | 6/2017 | Yang et al. | |
| 2017/0168626 A1 | 6/2017 | Konicek | |
| 2017/0220156 A1 | 8/2017 | Blondin et al. | |
| 2017/0228061 A1 | 8/2017 | Qiao et al. | |
| 2017/0229502 A1 | 8/2017 | Liu et al. | |
| 2017/0262121 A1 | 9/2017 | Kurasawa et al. | |
| 2017/0269729 A1 | 9/2017 | Chintalapoodi | |
| 2017/0285804 A1 | 10/2017 | Li et al. | |
| 2017/0315646 A1 | 11/2017 | Roziere | |
| 2017/0351378 A1 | 12/2017 | Wang et al. | |
| 2017/0357371 A1 | 12/2017 | Kim et al. | |
| 2018/0032176 A1 | 2/2018 | Krah et al. | |
| 2018/0067584 A1 | 3/2018 | Zhu et al. | |
| 2018/0074633 A1 | 3/2018 | Kida et al. | |
| 2018/0107309 A1 | 4/2018 | Endo et al. | |
| 2018/0224962 A1 | 8/2018 | Mori | |
| 2018/0253167 A1 | 9/2018 | Park et al. | |
| 2018/0275824 A1 | 9/2018 | Li et al. | |
| 2018/0307374 A1 | 10/2018 | Shah et al. | |
| 2018/0307375 A1 | 10/2018 | Shah et al. | |
| 2018/0314385 A1 | 11/2018 | Gupta et al. | |
| 2018/0367139 A1 | 12/2018 | Pribisic et al. | |
| 2019/0034032 A1 | 1/2019 | Westerman | |
| 2019/0073061 A1 | 3/2019 | Krah et al. | |
| 2019/0087051 A1 | 3/2019 | Yao et al. | |
| 2019/0138152 A1 | 5/2019 | Yousefpor et al. | |
| 2019/0220115 A1 | 7/2019 | Mori et al. | |
| 2019/0237963 A1 | 8/2019 | Wuerstlein et al. | |
| 2019/0302932 A1 | 10/2019 | Hotelling et al. | |
| 2020/0019265 A1 | 1/2020 | Krah et al. | |
| 2020/0326828 A1* | 10/2020 | Otagaki | G06F 3/0446 |
| 2020/0333902 A1 | 10/2020 | Li et al. | |
| 2020/0341585 A1 | 10/2020 | Li et al. | |
| 2020/0387248 A1* | 12/2020 | Kim | G06F 3/044 |
| 2020/0387259 A1 | 12/2020 | Krah | |
| 2022/0011920 A1 | 1/2022 | Shorten et al. | |
| 2022/0187956 A1 | 6/2022 | Hotelling et al. | |
| 2023/0040857 A1 | 2/2023 | Krah | |

FOREIGN PATENT DOCUMENTS

| | | |
|---|---|---|
| CN | 1527274 A | 9/2004 |
| CN | 1577385 A | 2/2005 |
| CN | 1672119 A | 9/2005 |
| CN | 1689677 A | 11/2005 |
| CN | 1711520 A | 12/2005 |
| CN | 1739083 A | 2/2006 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101122838 A | 2/2008 |
| CN | 101236320 A | 8/2008 |
| CN | 101349957 A | 1/2009 |
| CN | 101354620 A | 1/2009 |
| CN | 101419516 A | 4/2009 |
| CN | 201218943 Y | 4/2009 |
| CN | 101840293 A | 9/2010 |
| CN | 101859215 A | 10/2010 |
| CN | 102023768 A | 4/2011 |
| CN | 102411460 A | 4/2012 |
| CN | 102483659 A | 5/2012 |
| CN | 102483673 A | 5/2012 |
| CN | 102654664 A | 9/2012 |
| CN | 102760405 A | 10/2012 |
| CN | 102782626 A | 11/2012 |
| CN | 102804114 A | 11/2012 |
| CN | 102968235 A | 3/2013 |
| CN | 103019485 A | 4/2013 |
| CN | 103049148 A | 4/2013 |
| CN | 103052930 A | 4/2013 |
| CN | 103135815 A | 6/2013 |
| CN | 202976038 U | 6/2013 |
| CN | 103221910 A | 7/2013 |
| CN | 103258492 A | 8/2013 |
| CN | 103294321 A | 9/2013 |
| CN | 103365500 A | 10/2013 |
| CN | 103365506 A | 10/2013 |
| CN | 103577008 A | 2/2014 |
| CN | 103809810 A | 5/2014 |
| CN | 103885627 A | 6/2014 |
| CN | 103955322 A | 7/2014 |
| CN | 203720826 U | 7/2014 |
| CN | 104020880 A | 9/2014 |
| CN | 104020908 A | 9/2014 |
| CN | 104142757 A | 11/2014 |
| CN | 104252266 A | 12/2014 |
| CN | 105045446 A | 11/2015 |
| CN | 102648446 B | 1/2016 |
| CN | 105278739 A | 1/2016 |
| CN | 105302395 A | 2/2016 |
| CN | 105320383 A | 2/2016 |
| CN | 105474154 A | 4/2016 |
| CN | 205334405 U | 6/2016 |
| CN | 105824461 A | 8/2016 |
| CN | 107533393 A | 1/2018 |
| DE | 11-2008-001245 T5 | 3/2010 |
| DE | 10-2011-089693 A1 | 6/2013 |
| DE | 11-2012-004912 T5 | 8/2014 |
| EP | 853230 A1 | 7/1998 |
| EP | 1192585 A1 | 4/2002 |
| EP | 1278390 A1 | 1/2003 |
| EP | 1391807 A1 | 2/2004 |
| EP | 1455264 A2 | 9/2004 |
| EP | 1496425 A1 | 1/2005 |
| EP | 1573706 A2 | 9/2005 |
| EP | 1573706 A3 | 9/2005 |
| EP | 1192585 B1 | 12/2005 |
| EP | 1644918 A2 | 4/2006 |
| EP | 1717677 A2 | 11/2006 |
| EP | 1745356 A2 | 1/2007 |
| EP | 1455264 A3 | 3/2007 |
| EP | 1717677 A3 | 1/2008 |
| EP | 1918803 A1 | 5/2008 |
| EP | 1986084 A1 | 10/2008 |
| EP | 2045698 A2 | 4/2009 |
| EP | 2077489 A1 | 7/2009 |
| EP | 2144146 A1 | 1/2010 |
| EP | 2148264 A2 | 1/2010 |
| EP | 2224277 A1 | 9/2010 |
| EP | 2256606 A2 | 12/2010 |
| EP | 1455264 B1 | 5/2011 |
| EP | 2495643 A2 | 9/2012 |
| FR | 2756048 A1 | 5/1998 |
| FR | 2896595 A1 | 7/2007 |

(56) References Cited

FOREIGN PATENT DOCUMENTS

| | | |
|---|---|---|
| FR | 2949008 A1 | 2/2011 |
| FR | 3004551 A1 | 10/2014 |
| GB | 1546317 A | 5/1979 |
| GB | 2144146 A | 2/1985 |
| GB | 2428306 A | 1/2007 |
| GB | 2437827 A | 11/2007 |
| GB | 2450207 A | 12/2008 |
| JP | 10-505183 A | 5/1998 |
| JP | 2000-163031 A | 6/2000 |
| JP | 3134925 B2 | 2/2001 |
| JP | 2002-342033 A | 11/2002 |
| JP | 2003-66417 A | 3/2003 |
| JP | 2004-503835 A | 2/2004 |
| JP | 2004-526265 A | 8/2004 |
| JP | 2005-30901 A | 2/2005 |
| JP | 2005-84128 A | 3/2005 |
| JP | 2005-301373 A | 10/2005 |
| JP | 2006-500642 A | 1/2006 |
| JP | 2006-251927 A | 9/2006 |
| JP | 2007-18226 A | 1/2007 |
| JP | 2007-18515 A | 1/2007 |
| JP | 2007-152487 A | 6/2007 |
| JP | 2007-200177 A | 8/2007 |
| JP | 3134925 U | 8/2007 |
| JP | 2007-533044 A | 11/2007 |
| JP | 2008-510251 A | 4/2008 |
| JP | 2008-117371 A | 5/2008 |
| JP | 2008-225415 A | 9/2008 |
| JP | 2009-86240 A | 4/2009 |
| JP | 2009-157373 A | 7/2009 |
| JP | 2010-528186 A | 8/2010 |
| KR | 10-2004-0002983 A | 1/2004 |
| KR | 10-2004-0091728 A | 10/2004 |
| KR | 10-2007-0002327 A | 1/2007 |
| KR | 10-2008-0019125 A | 3/2008 |
| KR | 10-2008-0041278 A | 5/2008 |
| KR | 10-2010-0054899 A | 5/2010 |
| KR | 20110044670 A | 4/2011 |
| KR | 10-2012-0085737 A | 8/2012 |
| KR | 10-2013-0054463 A | 5/2013 |
| KR | 10-2013-0094495 A | 8/2013 |
| KR | 10-2013-0117499 A | 10/2013 |
| KR | 10-2014-0043395 A | 4/2014 |
| KR | 10-2014-0074454 A | 6/2014 |
| KR | 101609992 B1 | 4/2016 |
| TW | 200715015 A | 4/2007 |
| TW | 200826032 A | 6/2008 |
| TW | 200835294 A | 8/2008 |
| TW | M341273 U | 9/2008 |
| TW | M344522 U | 11/2008 |
| TW | M344544 U | 11/2008 |
| TW | M352721 U | 3/2009 |
| TW | 201115442 A | 5/2011 |
| TW | 201203069 A | 1/2012 |
| TW | 201401129 A | 1/2014 |
| TW | 201419071 A | 5/2014 |
| WO | 1997/18508 A1 | 5/1997 |
| WO | 1999/035633 A2 | 7/1999 |
| WO | 1999/035633 A3 | 9/1999 |
| WO | 2000/073984 A1 | 12/2000 |
| WO | 2001/097204 A1 | 12/2001 |
| WO | 2002/080637 A1 | 10/2002 |
| WO | 2003/079176 A2 | 9/2003 |
| WO | 2004/013833 A3 | 8/2004 |
| WO | 2004/112448 A2 | 12/2004 |
| WO | 2004/114265 A2 | 12/2004 |
| WO | 2004/013833 A3 | 8/2005 |
| WO | 2005/114369 A2 | 12/2005 |
| WO | 2005/114369 A3 | 1/2006 |
| WO | 2006/020305 A2 | 2/2006 |
| WO | 2006/023147 A2 | 3/2006 |
| WO | 2006/023147 A3 | 5/2006 |
| WO | 2006/104745 A2 | 10/2006 |
| WO | 2006/126703 A2 | 11/2006 |
| WO | 2006/130584 A2 | 12/2006 |
| WO | 2007/008518 A2 | 1/2007 |
| WO | 2007/012899 A1 | 2/2007 |
| WO | 2007/034591 A1 | 3/2007 |
| WO | 2006/020305 A3 | 5/2007 |
| WO | 2006/104745 A3 | 5/2007 |
| WO | 2006/130584 A3 | 5/2007 |
| WO | 2007/054018 A1 | 5/2007 |
| WO | 2007/058727 A1 | 5/2007 |
| WO | 2007/066488 A1 | 6/2007 |
| WO | 2007/089766 A2 | 8/2007 |
| WO | 2007/115032 A2 | 10/2007 |
| WO | 2007/146780 A2 | 12/2007 |
| WO | 2007/146785 A2 | 12/2007 |
| WO | 2007/115032 A3 | 1/2008 |
| WO | 2008/000964 A1 | 1/2008 |
| WO | 2008/007118 A2 | 1/2008 |
| WO | 2008/030780 A1 | 3/2008 |
| WO | 2008/047990 A1 | 4/2008 |
| WO | 2007/146785 A3 | 5/2008 |
| WO | 2008/076237 A2 | 6/2008 |
| WO | 2008/007118 A3 | 8/2008 |
| WO | 2008/076237 A3 | 8/2008 |
| WO | 2007/089766 A3 | 9/2008 |
| WO | 2007/146780 A3 | 9/2008 |
| WO | 2008/108514 A1 | 9/2008 |
| WO | 2008/135713 A1 | 11/2008 |
| WO | 2009/046363 A1 | 4/2009 |
| WO | 2009/103946 A1 | 8/2009 |
| WO | 2009/132146 A1 | 10/2009 |
| WO | 2009/132150 A1 | 10/2009 |
| WO | 2010/088659 A1 | 8/2010 |
| WO | 2010/117882 A2 | 10/2010 |
| WO | 2011/015795 A2 | 2/2011 |
| WO | 2011/028451 A1 | 3/2011 |
| WO | 2011/071784 A1 | 6/2011 |
| WO | 2011/015795 A3 | 7/2011 |
| WO | 2011/137200 A1 | 11/2011 |
| WO | 2013/093327 A1 | 6/2013 |
| WO | 2013/158570 A1 | 10/2013 |
| WO | 2014/105942 A1 | 7/2014 |
| WO | 2014/127716 A1 | 8/2014 |
| WO | 2015/017196 A1 | 2/2015 |
| WO | 2015/023410 A1 | 2/2015 |
| WO | 2015/072722 A1 | 5/2015 |
| WO | 2015/107969 A1 | 7/2015 |
| WO | 2015/178920 A1 | 11/2015 |
| WO | 2016/048269 A1 | 3/2016 |
| WO | 2016/066282 A1 | 5/2016 |
| WO | 2016/069642 A1 | 5/2016 |
| WO | 2016/126525 A1 | 8/2016 |
| WO | 2016/144437 A1 | 9/2016 |
| WO | 2017/058413 A1 | 4/2017 |
| WO | 2017/058415 A2 | 4/2017 |

OTHER PUBLICATIONS

Advisory Action received for U.S. Appl. No. 11/818,498, dated Oct. 14, 2011, 5 pages.
Advisory Action received for U.S. Appl. No. 12/110,024, dated Mar. 14, 2013, 3 pages.
Advisory Action received for U.S. Appl. No. 12/206,680, dated Apr. 16, 2012, 3 pages.
Advisory Action received for U.S. Appl. No. 12/238,333, dated Dec. 17, 2013, 3 pages.
Advisory Action received for U.S. Appl. No. 12/238,333, dated Oct. 21, 2015, 4 pages.
Advisory Action received for U.S. Appl. No. 12/333,250, dated Mar. 27, 2012, 3 pages.
Advisory Action received for U.S. Appl. No. 12/500,911, dated May 17, 2013, 3 pages.
Advisory Action received for U.S. Appl. No. 12/642,466, dated May 23, 2013, 2 pages.
Advisory Action received for U.S. Appl. No. 14/082,003, dated Mar. 10, 2016, 3 pages.
Advisory Action received for U.S. Appl. No. 14/645,120, dated Nov. 25, 2016, 3 pages.

(56) References Cited

OTHER PUBLICATIONS

Advisory Action received for U.S. Appl. No. 15/017,463, dated Aug. 8, 2018, 3 pages.
Corrected Notice of Allowance received for U.S. Appl. No. 12/333,250, dated Oct. 16, 2012, 5 pages.
Corrected Notice of Allowance received for U.S. Appl. No. 16/192,664, dated May 4, 2021, 3 pages.
Decision on Appeal received for U.S. Appl. No. 14/915,224, mailed on Jun. 30, 2021, 10 pages.
Examiner's Answer to Appeal Brief received for U.S. Appl. No. 11/818,498, mailed on Dec. 20, 2013, 17 pages.
Examiner's Answer to Appeal Brief received for U.S. Appl. No. 14/915,224, mailed on Oct. 6, 2020, 11 pages.
Extended European Search report received for European Patent Application No. 08022505.5, dated Apr. 25, 2012, 12 pages.
Extended European Search Report received for European Patent Application No. 10151969.2, dated Jul. 21, 2010, 5 pages.
Extended European Search Report received for European Patent Application No. 12162177.5, dated Dec. 3, 2012, 7 pages.
Extended European Search Report received for European Patent Application No. 12192450.0, dated Feb. 13, 2013, 6 pages.
Extended European Search Report received for European Patent Application No. 15166813.4, dated Aug. 31, 2015, 8 pages.
Extended European Search Report received for European Patent Application No. 18197785.1, dated Apr. 5, 2019, 8 pages.
Extended European Search Report received for European Patent Application No. 20206655.1, dated Feb. 19, 2021, 7 pages.
Extended European Search Report received for European Patent Application No. 20206655.1, dated Jul. 30, 2021, 8 pages.
Final Office Action received for U.S. Appl. No. 16/924,047, dated Apr. 13, 2022, 15 pages.
Final Office Action received for U.S. Appl. No. 11/818,498, dated Jan. 3, 2013, 17 pages.
Final Office Action received for U.S. Appl. No. 11/818,498, dated Jun. 10, 2011, 16 pages.
Final Office Action received for U.S. Appl. No. 12/038,760, dated Jul. 23, 2013, 20 pages.
Final Office Action received for U.S. Appl. No. 12/038,760, dated Jun. 8, 2011, 21 pages.
Final Office Action received for U.S. Appl. No. 12/110,024, dated Dec. 24, 2012, 21 pages.
Final Office Action received for U.S. Appl. No. 12/110,024, dated Jan. 19, 2012, 12 pages.
Final Office Action received for U.S. Appl. No. 12/110,075, dated Aug. 31, 2012, 15 pages.
Final Office Action received for U.S. Appl. No. 12/206,680, dated Jan. 5, 2012, 16 pages.
Final Office Action received for U.S. Appl. No. 12/206,680, dated Jan. 27, 2014, 20 pages.
Final Office Action received for U.S. Appl. No. 12/206,680, dated May 22, 2013, 16 pages.
Final Office Action received for U.S. Appl. No. 12/238,333, dated Apr. 22, 2015, 23 pages.
Final Office Action received for U.S. Appl. No. 12/238,333, dated Aug. 12, 2013, 19 pages.
Final Office Action received for U.S. Appl. No. 12/238,342, dated Aug. 13, 2013, 14 pages.
Final Office Action received for U.S. Appl. No. 12/238,342, dated Oct. 22, 2014, 16 pages.
Final Office Action received for U.S. Appl. No. 12/333,250, dated Dec. 15, 2011, 13 pages.
Final Office Action received for U.S. Appl. No. 12/494,173, dated Apr. 30, 2013, 7 pages.
Final Office Action received for U.S. Appl. No. 12/500,911, dated Feb. 5, 2013, 16 pages.
Final Office Action received for U.S. Appl. No. 12/545,604, dated Jul. 16, 2014, 18 pages.
Final Office Action received for U.S. Appl. No. 12/545,604, dated Jul. 19, 2013, 18 pages.
Final Office Action received for U.S. Appl. No. 12/545,754, dated Jun. 21, 2013, 6 pages.
Final Office Action received for U.S. Appl. No. 12/642,466, dated Feb. 1, 2013, 10 pages.
Final Office Action received for U.S. Appl. No. 12/642,466, dated Jan. 29, 2016, 10 pages.
Final Office Action received for U.S. Appl. No. 12/642,466, dated May 9, 2014, 13 pages.
Final Office Action received for U.S. Appl. No. 12/847,987, dated Apr. 23, 2014, 16 pages.
Final Office Action received for U.S. Appl. No. 13/448,182, dated Jun. 11, 2015, 13 pages.
Non-Final Office Action received for U.S. Appl. No. 13/448,182, dated Oct. 22, 2014, 12 pages.
Final Office Action received for U.S. Appl. No. 13/899,391, dated Apr. 8, 2016, 10 pages.
Final Office Action received for U.S. Appl. No. 14/082,003, dated Jan. 4, 2016, 26 pages.
Final Office Action received for U.S. Appl. No. 14/082,003, dated Nov. 4, 2016, 19 pages.
Final Office Action received for U.S. Appl. No. 14/082,074, dated Nov. 12, 2015, 23 pages.
Final Office Action received for U.S. Appl. No. 14/157,737, dated Aug. 31, 2015, 28 pages.
Final Office Action received for U.S. Appl. No. 14/318,157, dated Jul. 26, 2017, 10 pages.
Final Office Action received for U.S. Appl. No. 14/318,157, dated May 9, 2016, 10 pages.
Final Office Action received for U.S. Appl. No. 14/550,686, dated Aug. 21, 2017, 12 pages.
Final Office Action received for U.S. Appl. No. 14/550,686, dated Jun. 14, 2016, 11 pages.
Final Office Action received for U.S. Appl. No. 14/558,529, dated Sep. 29, 2016, 23 pages.
Final Office Action received for U.S. Appl. No. 14/645,120, dated Aug. 10, 2017, 13 pages.
Final Office Action received for U.S. Appl. No. 14/645,120, dated May 27, 2016, 13 pages.
Final Office Action received for U.S. Appl. No. 14/915,224, dated Jan. 14, 2019, 8 pages.
Final Office Action received for U.S. Appl. No. 14/915,224, dated Nov. 18, 2019, 9 pages.
Final Office Action received for U.S. Appl. No. 14/993,017, dated Aug. 16, 2018, 35 pages.
Final Office Action received for U.S. Appl. No. 14/997,031, dated Jun. 14, 2018, 19 pages.
Final Office Action received for U.S. Appl. No. 15/006,987, dated Dec. 5, 2017, 16 pages.
Final Office Action received for U.S. Appl. No. 15/006,987, dated May 14, 2018, 11 pages.
Final Office Action received for U.S. Appl. No. 15/009,774, dated Feb. 6, 2019, 16 pages.
Final Office Action received for U.S. Appl. No. 15/017,463, dated Feb. 13, 2020, 22 pages.
Final Office Action received for U.S. Appl. No. 15/017,463, dated May 17, 2018, 23 pages.
Final Office Action received for U.S. Appl. No. 15/090,555, dated Aug. 29, 2018, 18 pages.
Final Office Action received for U.S. Appl. No. 15/097,179, dated Jul. 27, 2018, 12 pages.
Final Office Action received for U.S. Appl. No. 15/226,628, dated Mar. 28, 2018, 17 pages.
Final Office Action received for U.S. Appl. No. 15/228,942, dated Apr. 17, 2019, 9 pages.
Final Office Action received for U.S. Appl. No. 15/313,549, dated Dec. 18, 2019, 24 pages.
Final Office Action received for U.S. Appl. No. 15/507,722, dated Sep. 13, 2019, 18 pages.
Final Office Action received for U.S. Appl. No. 15/522,737, dated Sep. 12, 2019, 15 pages.
Final Office Action received for U.S. Appl. No. 16/152,326, dated Dec. 4, 2020, 10 pages.

(56) References Cited

OTHER PUBLICATIONS

Final Office Action received for U.S. Appl. No. 16/152,326, dated Jan. 27, 2020, 10 pages.
Final Office Action received for U.S. Appl. No. 16/192,664, dated Apr. 16, 2020, 10 pages.
Final Office Action received for U.S. Appl. No. 16/192,664, dated Nov. 19, 2020, 11 pages.
Final Office Action received for U.S. Appl. No. 16/201,730, dated Nov. 1, 2019, 11 pages.
Final Office Action received for U.S. Appl. No. 16/447,811, dated Jun. 22, 2021, 11 pages.
First Action Interview Office Action received for U.S. Appl. No. 15/686,969, dated Aug. 19, 2019, 7 pages.
First Action Interview received for U.S. Appl. No. 15/228,942, dated Nov. 26, 2018, 5 pages.
International Search Report received for PCT Patent Application No. PCT/US2008/078836, dated Mar. 19, 2009, 3 pages.
International Search Report received for PCT Patent Application No. PCT/US2009/041460, dated Jul. 17, 2009, 3 pages.
International Search Report received for PCT Patent Application No. PCT/US2009/041465, dated Aug. 5, 2009, 4 pages.
International Search Report received for PCT Patent Application No. PCT/US2010/022868, dated Mar. 10, 2010, 3 pages.
International Search Report received for PCT Patent Application No. PCT/US2010/029698, dated Jan. 14, 2011, 4 pages.
International Search Report received for PCT Patent Application No. PCT/US2010/058988, dated May 2, 2011, 4 pages.
International Search Report received for PCT Patent Application No. PCT/US2013/036662, dated Aug. 6, 2013, 3 pages.
International Search Report received for PCT Patent Application No. PCT/US2014/039245, dated Sep. 24, 2014, 3 pages.
International Search Report received for PCT Patent Application No. PCT/US2014/047888, dated Jan. 29, 2015, 6 pages.
International Search Report received for PCT Patent Application No. PCT/US2014/056795, dated Dec. 12, 2014, 3 pages.
International Search Report received for PCT Patent Application No. PCT/US2015/057644, dated Jan. 8, 2016, 3 pages.
International Search Report received for PCT Patent Application No. PCT/US2016/015479, dated May 9, 2016, 3 pages.
International Search Report received for PCT Patent Application No. PCT/US2016/016011, dated May 11, 2016, 6 pages.
International Search Report received for PCT Patent Application No. PCT/US2016/048694, dated Oct. 31, 2016, 4 pages.
International Search Report received for PCT Patent Application No. PCT/US2016/048750, dated May 4, 2017, 6 pages.
Non-Final Office Action received for U.S. Appl. No. 11/818,498, dated Dec. 13, 2010, 16 pages.
Non-Final Office Action received for U.S. Appl. No. 11/818,498, dated May 25, 2012, 17 pages.
Non-Final Office Action received for U.S. Appl. No. 12/038,760, dated Feb. 4, 2011, 19 pages.
Non-Final Office Action received for U.S. Appl. No. 12/038,760, dated Jan. 2, 2013, 20 pages.
Non-Final Office Action received for U.S. Appl. No. 12/110,024, dated Jul. 3, 2012, 20 pages.
Non-Final Office Action received for U.S. Appl. No. 12/110,024, dated Jul. 11, 2011, 13 pages.
Non-Final Office Action received for U.S. Appl. No. 12/110,075, dated Jan. 25, 2012, 22 pages.
Non-Final Office Action received for U.S. Appl. No. 12/110,075, dated Jul. 8, 2011, 15 pages.
Non-Final Office Action received for U.S. Appl. No. 12/110,075, dated Mar. 28, 2013, 14 pages.
Non-Final Office Action received for U.S. Appl. No. 12/206,680, dated Jun. 9, 2011, 14 pages.
Non-Final Office Action received for U.S. Appl. No. 12/206,680, dated Sep. 26, 2012, 14 pages.
Non-Final Office Action received for U.S. Appl. No. 12/206,680, dated Sep. 30, 2013, 19 pages.
Non-Final Office Action received for U.S. Appl. No. 12/238,333, dated Jan. 7, 2013, 21 pages.
Non-Final Office Action received for U.S. Appl. No. 12/238,333, dated May 3, 2012, 24 pages.
Non-Final Office Action received for U.S. Appl. No. 12/238,333, dated Sep. 18, 2014, 22 pages.
Non-Final Office Action received for U.S. Appl. No. 12/238,342, dated Feb. 15, 2013, 18 pages.
Non-Final Office Action received for U.S. Appl. No. 12/238,342, dated Mar. 9, 2012, 27 pages.
Non-Final Office Action received for U.S. Appl. No. 12/238,342, dated Mar. 12, 2014, 17 pages.
Non-Final Office Action received for U.S. Appl. No. 12/333,250, dated Aug. 17, 2011, 13 pages.
Non-Final Office Action received for U.S. Appl. No. 12/494,173, dated Nov. 28, 2012, 7 pages.
Non-Final Office Action received for U.S. Appl. No. 12/500,911, dated Jun. 7, 2012, 17 pages.
Non-Final Office Action received for U.S. Appl. No. 12/545,557, dated Jan. 3, 2014, 10 pages.
Non-Final Office Action received for U.S. Appl. No. 12/545,557, dated Nov. 23, 2012, 11 pages.
Non-Final Office Action received for U.S. Appl. No. 12/545,604, dated Dec. 19, 2013, 17 pages.
Non-Final Office Action received for U.S. Appl. No. 12/545,604, dated Jan. 7, 2013, 13 pages.
Non-Final Office Action received for U.S. Appl. No. 12/545,754, dated Jan. 2, 2014, 12 pages.
Non-Final Office Action received for U.S. Appl. No. 12/545,754, dated Oct. 5, 2012, 10 pages.
Non-Final Office Action received for U.S. Appl. No. 12/545,754, dated Sep. 10, 2013, 6 pages.
Non-Final Office Action received for U.S. Appl. No. 12/642,466, dated Aug. 28, 2012, 10 pages.
Non-Final Office Action received for U.S. Appl. No. 12/642,466, dated May 4, 2015, 10 pages.
Non-Final Office Action received for U.S. Appl. No. 12/642,466, dated Nov. 8, 2013, 13 pages.
Non-Final Office Action received for U.S. Appl. No. 12/847,987, dated Sep. 6, 2013, 16 pages.
Non-Final Office Action received for U.S. Appl. No. 13/448,182, dated Jan. 31, 2014, 18 pages.
Non-Final Office Action received for U.S. Appl. No. 13/737,779, dated Mar. 29, 2013, 10 pages.
Non-Final Office Action received for U.S. Appl. No. 13/766,376, dated Jul. 31, 2015, 29 pages.
Non-Final Office Action received for U.S. Appl. No. 13/899,391, dated Oct. 5, 2015, 11 pages.
Non-Final Office Action received for U.S. Appl. No. 14/055,717, dated Apr. 10, 2014, 11 pages.
Non-Final Office Action received for U.S. Appl. No. 14/082,003, dated Mar. 13, 2017, 21 pages.
Non-Final Office Action received for U.S. Appl. No. 14/082,003, dated May 8, 2015, 26 pages.
Non-Final Office Action received for U.S. Appl. No. 14/082,003, dated May 25, 2016, 23 pages.
Non-Final Office Action received for U.S. Appl. No. 14/082,074, dated Apr. 10, 2015, 24 pages.
Non-Final Office Action received for U.S. Appl. No. 14/157,737, dated Feb. 10, 2015, 24 pages.
Non-Final Office Action received for U.S. Appl. No. 14/318,157, dated Apr. 3, 2018, 12 pages.
Non-Final Office Action received for U.S. Appl. No. 14/318,157, dated Dec. 19, 2016, 11 pages.
Non-Final Office Action received for U.S. Appl. No. 14/318,157, dated Oct. 6, 2015, 8 pages.
Non-Final Office Action received for U.S. Appl. No. 14/550,686, dated Aug. 20, 2015, 11 pages.
Non-Final Office Action received for U.S. Appl. No. 14/550,686, dated Dec. 14, 2016, 9 pages.
Non-Final Office Action received for U.S. Appl. No. 14/558,529, dated Apr. 14, 2016, 21 pages.

(56) References Cited

OTHER PUBLICATIONS

Non-Final Office Action received for U.S. Appl. No. 14/558,529, dated Jun. 26, 2017, 6 pages.
Non-Final Office Action received for U.S. Appl. No. 14/615,186, dated Jun. 1, 2016, 9 pages.
Non-Final Office Action received for U.S. Appl. No. 14/645,120, dated Dec. 16, 2016, 11 pages.
Non-Final Office Action received for U.S. Appl. No. 14/645,120, dated Oct. 27, 2015, 9 pages.
Non-Final Office Action received for U.S. Appl. No. 14/915,224, dated Aug. 9, 2018, 7 pages.
Non-Final Office Action received for U.S. Appl. No. 14/915,224, dated Jul. 22, 2019, 6 pages.
Non-Final Office Action received for U.S. Appl. No. 14/993,017, dated Dec. 22, 2017, 24 pages.
Non-Final Office Action received for U.S. Appl. No. 14/993,017, dated Jan. 18, 2019, 35 pages.
Non-Final Office Action received for U.S. Appl. No. 15/006,987, dated Jun. 14, 2017, 15 pages.
Non-Final Office Action received for U.S. Appl. No. 15/009,774, dated Jun. 20, 2018, 19 pages.
Non-Final Office Action received for U.S. Appl. No. 15/009,774, dated Sep. 4, 2019, 18 pages.
Non-Final Office Action received for U.S. Appl. No. 15/017,463, dated May 15, 2019, 20 pages.
Non-Final Office Action received for U.S. Appl. No. 15/017,463, dated Sep. 14, 2017, 23 pages.
Non-Final Office Action received for U.S. Appl. No. 15/039,400, dated Nov. 24, 2017, 17 pages.
Non-Final Office Action received for U.S. Appl. No. 15/087,956, dated Jan. 18, 2019, 13 pages.
Non-Final Office Action received for U.S. Appl. No. 15/089,432, dated Jan. 24, 2018, 28 pages.
Non-Final Office Action received for U.S. Appl. No. 15/090,555, dated Nov. 3, 2017, 28 pages.
Non-Final Office Action received for U.S. Appl. No. 15/097,179, dated Jan. 22, 2018, 12 pages.
Non-Final Office Action received for U.S. Appl. No. 15/144,706, dated Apr. 7, 2017, 9 pages.
Non-Final Office Action received for U.S. Appl. No. 15/148,798, dated Oct. 30, 2017, 11 pages.
Non-Final Office Action received for U.S. Appl. No. 15/226,628, dated Aug. 11, 2017, 11 pages.
Non-Final Office Action received for U.S. Appl. No. 15/226,628, dated Aug. 27, 2018, 17 pages.
Non-Final Office Action received for U.S. Appl. No. 15/311,836, dated Dec. 15, 2017, 15 pages.
Non-Final Office Action received for U.S. Appl. No. 15/313,549, dated Apr. 23, 2020, 33 pages.
Non-Final Office Action received for U.S. Appl. No. 15/313,549, dated Dec. 21, 2018, 14 pages.
Non-Final Office Action received for U.S. Appl. No. 15/313,549, dated Jul. 10, 2019, 25 pages.
Non-Final Office Action received for U.S. Appl. No. 15/507,722, dated Feb. 11, 2019, 16 pages.
Non-Final Office Action received for U.S. Appl. No. 15/522,737, dated Jan. 2, 2019, 14 pages.
Non-Final Office Action received for U.S. Appl. No. 15/687,354, dated May 23, 2019, 18 pages.
Non-Final Office Action received for U.S. Appl. No. 16/030,654, dated Feb. 21, 2020, 15 pages.
Non-Final Office Action received for U.S. Appl. No. 16/152,326, dated Apr. 26, 2021, 12 pages.
Non-Final Office Action received for U.S. Appl. No. 16/152,326, dated Aug. 14, 2019, 12 pages.
Non-Final Office Action received for U.S. Appl. No. 16/152,326, dated Jun. 29, 2020, 10 pages.
Non-Final Office Action received for U.S. Appl. No. 16/179,565, dated Dec. 13, 2018, 9 pages.
Non-Final Office Action received for U.S. Appl. No. 16/192,664, dated Jul. 30, 2020, 10 pages.
Non-Final Office Action received for U.S. Appl. No. 16/192,664, dated Nov. 26, 2019, 9 pages.
Non-Final Office Action received for U.S. Appl. No. 16/201,730, dated May 10, 2019, 9 pages.
Non-Final Office Action received for U.S. Appl. No. 16/447,811, dated Jan. 6, 2021, 29 pages.
Non-Final Office Action received for U.S. Appl. No. 16/581,721, dated Oct. 30, 2019, 10 pages.
Non-Final Office Action received for U.S. Appl. No. 16/786,921, dated Dec. 10, 2020, 22 pages.
Non-Final Office Action received for U.S. Appl. No. 16/921,817, dated Sep. 22, 2021, 24 pages.
Non-Final Office Action received for U.S. Appl. No. 16/924,047, dated Sep. 24, 2021, 17 pages.
Non-Final Office Action received for U.S. Appl. No. 17/003,133, dated Aug. 3, 2021, 22 pages.
Notice of Allowability received for U.S. Appl. No. 16/152,326, dated Dec. 10, 2021, 3 pages.
Notice of Allowability received for U.S. Appl. No. 16/786,921, dated Jul. 16, 2021, 2 pages.
Notice of Allowance received for U.S. Appl. No. 12/038,760, dated Nov. 8, 2013, 15 pages.
Notice of Allowance received for U.S. Appl. No. 12/110,024, dated Mar. 26, 2013, 4 pages.
Notice of Allowance received for U.S. Appl. No. 12/110,024, dated May 23, 2013, 5 pages.
Notice of Allowance received for U.S. Appl. No. 12/110,075, dated Aug. 19, 2013, 8 pages.
Notice of Allowance received for U.S. Appl. No. 12/238,333, dated Dec. 1, 2015, 10 pages.
Notice of Allowance received for U.S. Appl. No. 12/333,250, dated Aug. 28, 2012, 10 pages.
Notice of Allowance received for U.S. Appl. No. 12/494,173, dated Oct. 15, 2014, 8 pages.
Notice of Allowance received for U.S. Appl. No. 12/500,911, dated Aug. 19, 2013, 7 pages.
Notice of Allowance received for U.S. Appl. No. 12/545,557, dated Apr. 11, 2014, 9 pages.
Notice of Allowance received for U.S. Appl. No. 12/545,557, dated Jun. 10, 2013, 9 pages.
Notice of Allowance received for U.S. Appl. No. 12/545,604, dated Oct. 5, 2015, 9 pages.
Notice of Allowance received for U.S. Appl. No. 12/545,754, dated Aug. 21, 2014, 10 pages.
Notice of Allowance received for U.S. Appl. No. 13/448,182, dated Jan. 8, 2016, 9 pages.
Notice of Allowance received for U.S. Appl. No. 13/737,779, dated Sep. 3, 2013, 11 pages.
Notice of Allowance received for U.S. Appl. No. 13/766,376, dated Jan. 11, 2016, 10 pages.
Notice of Allowance received for U.S. Appl. No. 14/055,717, dated Nov. 7, 2014, 7 pages.
Notice of Allowance received for U.S. Appl. No. 14/082,003, dated Oct. 3, 2017, 10 pages.
Notice of Allowance received for U.S. Appl. No. 14/082,003, dated Sep. 20, 2017, 9 pages.
Notice of Allowance received for U.S. Appl. No. 14/157,737, dated Dec. 14, 2015, 5 pages.
Notice of Allowance received for U.S. Appl. No. 14/312,489, dated Mar. 16, 2015, 8 pages.
Notice of Allowance received for U.S. Appl. No. 14/318,157, dated Dec. 31, 2018, 8 pages.
Notice of Allowance received for U.S. Appl. No. 14/329,719, dated Nov. 2, 2015, 9 pages.
Notice of Allowance received for U.S. Appl. No. 14/550,686, dated Feb. 9, 2018, 12 pages.
Notice of Allowance received for U.S. Appl. No. 14/558,529, dated Oct. 13, 2017, 8 pages.
Notice of Allowance received for U.S. Appl. No. 14/615,186, dated Dec. 2, 2016, 7 pages.

(56) References Cited

OTHER PUBLICATIONS

Notice of Allowance received for U.S. Appl. No. 14/645,120, dated Mar. 1, 2018, 6 pages.
Notice of Allowance received for U.S. Appl. No. 14/915,224, dated Sep. 7, 2021, 5 pages.
Notice of Allowance received for U.S. Appl. No. 14/993,017, dated Jul. 12, 2019, 10 pages.
Notice of Allowance received for U.S. Appl. No. 15/009,774, dated Jul. 1, 2020, 6 pages.
Notice of Allowance received for U.S. Appl. No. 15/009,774, dated Mar. 20, 2020, 16 pages.
Notice of Allowance received for U.S. Appl. No. 15/039,400, dated Nov. 14, 2018, 2 pages.
Notice of Allowance received for U.S. Appl. No. 15/039,400, dated Oct. 12, 2018, 9 pages.
Notice of Allowance received for U.S. Appl. No. 15/087,956, dated Mar. 11, 2019, 11 pages.
Notice of Allowance received for U.S. Appl. No. 15/089,432, dated Jul. 30, 2018, 10 pages.
Notice of Allowance received for U.S. Appl. No. 15/090,555, dated Feb. 12, 2019, 7 pages.
Notice of Allowance received for U.S. Appl. No. 15/144,706, dated Sep. 20, 2017, 9 pages.
Notice of Allowance received for U.S. Appl. No. 15/148,798, dated Mar. 14, 2018, 10 pages.
Notice of Allowance received for U.S. Appl. No. 15/226,628, dated Apr. 3, 2019, 6 pages.
Notice of Allowance received for U.S. Appl. No. 15/228,942, dated Aug. 30, 2019, 12 pages.
Notice of Allowance received for U.S. Appl. No. 15/311,836, dated Jul. 5, 2018, 9 pages.
Notice of Allowance received for U.S. Appl. No. 15/313,549, dated Oct. 21, 2020, 10 pages.
Notice of Allowance received for U.S. Appl. No. 15/507,722, dated Feb. 27, 2020, 9 pages.
Notice of Allowance received for U.S. Appl. No. 15/522,737, dated Mar. 6, 2020, 8 pages.
Notice of Allowance received for U.S. Appl. No. 15/663,271, dated Jul. 5, 2018, 10 pages.
Notice of Allowance received for U.S. Appl. No. 15/686,969, dated Jan. 2, 2020, 8 pages.
Notice of Allowance received for U.S. Appl. No. 15/687,078, dated Apr. 3, 2019, 9 pages.
Notice of Allowance received for U.S. Appl. No. 15/687,354, dated Sep. 6, 2019, 12 pages.
Notice of Allowance received for U.S. Appl. No. 15/691,283, dated Jun. 5, 2019, 10 pages.
Notice of Allowance received for U.S. Appl. No. 16/152,326, dated Nov. 26, 2021, 9 pages.
Notice of Allowance received for U.S. Appl. No. 16/179,565, dated Jun. 6, 2019, 7 pages.
Notice of Allowance received for U.S. Appl. No. 16/192,664, dated Apr. 2, 2021, 10 pages.
Notice of Allowance received for U.S. Appl. No. 16/447,811, dated Nov. 19, 2021, 10 pages.
Notice of Allowance received for U.S. Appl. No. 16/581,721, dated Apr. 22, 2020, 5 pages.
Notice of Allowance received for U.S. Appl. No. 16/581,721, dated Aug. 4, 2020, 5 pages.
Notice of Allowance received for U.S. Appl. No. 16/786,921, dated Jul. 1, 2021, 8 pages.
Notice of Allowance received for U.S. Appl. No. 17/003,133, dated Feb. 10, 2022, 6 pages.
Notice of Allowance received for U.S. Appl. No. 16/030,654, dated Jun. 16, 2020, 8 pages.
Patent Board Decision received for U.S. Appl. No. 11/818,498, mailed on Nov. 2, 2016, 8 pages.
Pre-Interview First Office Action received for U.S. Appl. No. 15/228,942, dated Sep. 13, 2018, 4 pages.
Pre-Interview First Office Action received for U.S. Appl. No. 15/686,969, dated Apr. 4, 2019, 4 pages.
Restriction Requirement received for U.S. Appl. No. 12/238,333, dated Mar. 8, 2012, 6 pages.
Restriction Requirement received for U.S. Appl. No. 12/494,173, dated Aug. 8, 2012, 5 pages.
Restriction Requirement received for U.S. Appl. No. 13/766,376, dated Mar. 16, 2015, 6 pages.
Restriction Requirement received for U.S. Appl. No. 13/899,391, dated Apr. 8, 2015, 6 pages.
Restriction Requirement received for U.S. Appl. No. 14/915,224, dated Apr. 4, 2018, 10 pages.
Restriction Requirement received for U.S. Appl. No. 15/087,956, dated Feb. 13, 2018, 8 pages.
Restriction Requirement received for U.S. Appl. No. 15/089,432, dated Jul. 17, 2017, 5 pages.
Restriction Requirement received for U.S. Appl. No. 15/097,179, dated Sep. 28, 2017, 6 pages.
Restriction Requirement received for U.S. Appl. No. 15/228,942, dated Mar. 21, 2018, 6 pages.
Restriction Requirement received for U.S. Appl. No. 15/691,283, dated Mar. 5, 2019, 6 pages.
Restriction Requirement received for U.S. Appl. No. 16/447,811, dated Aug. 11, 2020, 5 pages.
Search Report received for Chinese Patent Application No. 2008201338142, dated Jan. 10, 2011, 25 pages (16 pages of English Translation and 9 pages of Official copy).
Search Report received for Chinese Patent Application No. 2009200081997, dated Jan. 7, 2011, 14 pages (8 pages of English Translation and 6 pages of Official copy).
Search Report received for Chinese Patent Application No. 201310042816.6, completed on May 18, 2015, 4 pages (2 pages of English Translation and 2 pages of Official copy).
Search Report received for Chinese Patent Application No. 201680008313.9, dated Jul. 5, 2019, 4 pages (2 pages English Translation and 2 pages of Official copy).
Search Report received for Chinese Patent Application No. 201780046939.3, dated Jun. 30, 2021, 6 pages (3 page of English Translation and 3 page of Official Copy).
Search Report received for Chinese Patent Application No. 201910391469.5, dated Jan. 27, 2022, 5 pages (2 pages of English Translation and 3 pages of Official Copy).
Search Report received for Chinese Patent Application No. ZL2009201524013, completed on Jun. 3, 2011, 20 pages (13 pages of English Translation and 7 pages of Official copy).
Search Report received for Chinese Patent Application No. ZL201020108330.X, completed on Dec. 14, 2011, 20 pages (12 pages of English Translation and 8 pages of Official copy).
Search Report received for European Patent Application No. 08017396.6, dated Mar. 19, 2009, 7 pages.
Search Report received for European Patent Application No. 17183937.6, dated Jan. 31, 2018, 4 pages.
Search Report received for Great Britain Patent Application No. GB0817242.1, dated Jan. 19, 2009, 2 pages.
Search Report received for Great Britain Patent Application No. GB0817242.1, dated Jan. 19, 2010, 2 pages.
Search Report received for Netherlands Patent Application No. 2001672, dated Apr. 29, 2009, 8 pages.
Search Report received for Taiwanese Patent Application No. 103105965, dated Nov. 12, 2015, 2 pages (1 page of English Translation and 1 page of Official copy).
Search Report received for Taiwanese Patent Application No. 103116003, dated Oct. 14, 2015, 2 pages (1 page of English Translation and 1 page of Official copy).
Search Report received for Taiwanese Patent Application No. 104115152, dated May 3, 2016, 2 pages (1 page of English Translation and 1 page of Official copy).
Supplemental Notice of Allowance received for U.S. Appl. No. 15/686,969, dated Feb. 21, 2020, 2 pages.
Supplementary European Search Report received for European Patent Application No. 14902458.0, dated Jul. 27, 2017, 4 pages.
Cassidy Robin, "The Tissot T-Touch Watch—A Groundbreaking Timepiece", Ezine Articles, Available online at: <http://ezinearticles.

(56) References Cited

OTHER PUBLICATIONS com/?The-Tissot-T-Touch-Watch---A-Groundbreaking-Timepiece &id . . . >, Feb. 23, 2007, 2 pages.

Gibilisco Stan, "The Illustrated Dictionary of Electronics", Eighth Edition, 2001, 2 pages.

Jinpu et al., "Probe into the Function of Touch Panel", vol. 2008, No. 14, Jul. 15, 2008, 3 pages. (Abstract submitted in English).

Lee et al., "A Multi-Touch Three Dimensional Touch-Sensitive Tablet", CHI'85 Proceedings, Apr. 1985, pp. 21-25.

Lowe Doug, "Electronics Components: How to Use an Op Amp as a Voltage Comparator", Dummies, Available online at: <https://www.dummies.com/programming/electronics/components/electronics-components-how-to-use-an-op-amp-as-a-voltage-comparator/>, 2012, 9 pages.

Mainardi Elena, "Design of a Portable Touchscreen Interface for Powerline Domotic Systems", IEEE International Conference on Automation Science and Engineering, Aug. 23-26, 2008, 5 pages.

Malik et al., "Visual Touchpad: A Two-Handed Gestural Input Device", Proceedings of the 6th International Conference on Multimodal Interfaces, State College, PA, ICMI '04, ACM, Oct. 13-15, 2004, pp. 289-296.

O'Connor Todd, "mTouch Projected Capacitive Touch Screen Sensing Theory of Operation", Microchip TB3064, Microchip Technology Inc., 2010, pp. 1-16.

Rekimoto J., "SmartSkin: An Infrastructure for Freehand Manipulation on Interactive Surfaces", CHI 2002 Conference Proceedings, Conference on Human Factors in Computing Systems, Minneapolis, vol. 4, No. 1, Apr. 20-25, 2002, pp. 113-120.

Rubine Dean, "Combining Gestures and Direct Manipulation", CHI'92, May 3-7, 1992, pp. 659-660.

Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Wilson Andrewd., "Robust Computer Vision-Based Detection of Pinching for One and Two-Handed Gesture Input", ACM, USIT '06, Montreux, Oct. 15-18, 2006, 4 pages.

Yang et al., "A Noise-Immune High-Speed Readout Circuit for In-Cell Touch Screen Panels", IEEE Transactions on Circuits and Systems-I: Regular Papers vol. 60, No. 7, Jul. 2013, pp. 1800-1809.

Final Office Action received for U.S. Appl. No. 16/921,817, dated Jun. 22, 2022, 24 Pages.

Non-Final Office Action received for U.S. Appl. No. 17/448,879, dated Jun. 24, 2022, 19 Pages.

Notice of Allowance received for U.S. Appl. No. 16/921,817, dated Nov. 30, 2022, 9 pages.

Notice of Allowance received for U.S. Appl. No. 16/924,047, dated Sep. 21, 2022, 7 pages.

Final Office Action received for U.S. Appl. No. 17/448,879, dated Jan. 9, 2023, 19 pages.

Restriction Requirement received for U.S. Appl. No. 17/653,231, dated Nov. 8, 2022, 5 pages.

\* cited by examiner

Table 3

| | Column 1 | Column 2 | Column 3 | Column 4 | Column 5 | Column 6 | Column 7 | Column 8 | Column 9 | Column 10 |
|---|---|---|---|---|---|---|---|---|---|---|
| Step 1 | - | - | - | + | + | + | + | + | + | 0 |
| Step 2 | + | + | + | - | - | - | + | + | + | 0 |
| Step 3 | + | + | + | + | + | + | - | - | - | 0 |
| Step 4 | 0 | - | - | - | + | + | + | + | + | + |
| Step 5 | 0 | + | + | + | - | - | - | + | + | + |
| Step 6 | 0 | + | + | + | + | + | + | - | - | - |
| Step 7 | + | 0 | - | - | - | + | + | + | + | + |
| Step 8 | + | 0 | + | + | + | - | - | - | + | + |
| Step 9 | - | 0 | + | + | + | + | + | + | - | - |
| Step 10 | + | + | + | + | + | + | + | + | + | + |

*FIG. 11*

HOVER DETECTION ON A TOUCH SENSOR PANEL

CROSS-REFERENCE TO RELATED APPLICATION

This application claims the benefit of U.S. Provisional Application No. 63/032,575, filed May 30, 2020, the content of which is hereby incorporated by reference in its entirety for all purposes.

FIELD OF THE DISCLOSURE

This relates generally to methods and systems for performing hover detection on a touch sensor paned.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes or sensing electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels). In some cases, capacitive touch sensor panel can operate in a mutual capacitance or self-capacitance mode.

SUMMARY OF THE DISCLOSURE

This relates to systems and methods of improving detection sensitivity of touch sensor panels that are operating in mutual capacitance mode, such as to detect proximity (e.g., hover) events, for example. In some examples, a touch sensor panel can be arranged in rows and columns of touch electrodes. In a mutual capacitance sensing mode, the intersection of the rows or columns form a capacitance that can be measured by a touch sensing circuit. In some examples, the rows and/or columns can be driven by a known drive signal and other rows and/or columns can be sensed to determine the capacitance at the respective intersections. When an object such as a finger or stylus approaches and/or contacts the touch sensor panel, the capacitance at respective intersections changes due to the object's interference with the electromagnetic fields between the touch electrodes. In some examples, multiple rows and/or columns can be driven simultaneously (optionally with the same drive signal) to increase the field penetration of the generated electromagnetic fields. In some examples, the sensed change in capacitance due to the object's interaction with the touch sensor panel can be small relative to the overall capacitance formed by the intersection of the touch electrodes. In some examples, an offset signal can be injected into touch sensing circuits to offset baseline capacitance.

BRIEF DESCRIPTION OF THE DRAWINGS

FIG. 11 illustrates an example multi-scan scan sequence.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to systems and methods of improving detection sensitivity of touch sensor panels that are operating in mutual capacitance mode, such as to detect proximity (e.g., hover) events, for example. In some examples, a touch sensor panel can be arranged in rows and columns of touch electrodes. In a mutual capacitance sensing mode, the intersection of the rows or columns form a capacitance that can be measured by a touch sensing circuit. In some examples, the rows and/or columns can be driven by a known drive signal and other rows and/or columns can be sensed to determine the capacitance at the respective intersections. When an object such as a finger or stylus approaches and/or contacts the touch sensor panel, the capacitance at respective intersections changes due to the object's interference with the electromagnetic fields between the touch electrodes. In some examples, the change in capacitance can be small relative to the overall capacitance formed by the intersection of the touch electrodes. In some examples, multiple rows and/or columns can be driven simultaneously to increase the field penetration of the generated electromagnetic fields. In some examples, an offset signal can be injected into touch sensing circuits to offset baseline capacitance.

Figure 1A:
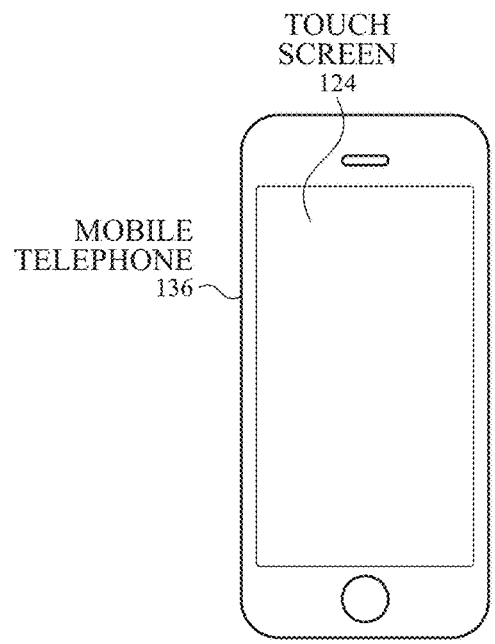
FIGS. 1A-1E illustrate example systems that can implement touch sensing according to examples of the disclosure.
Figure 1B:
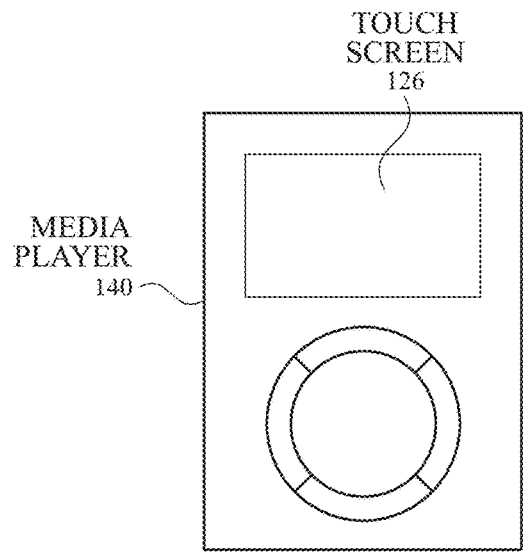
Figure 1C:
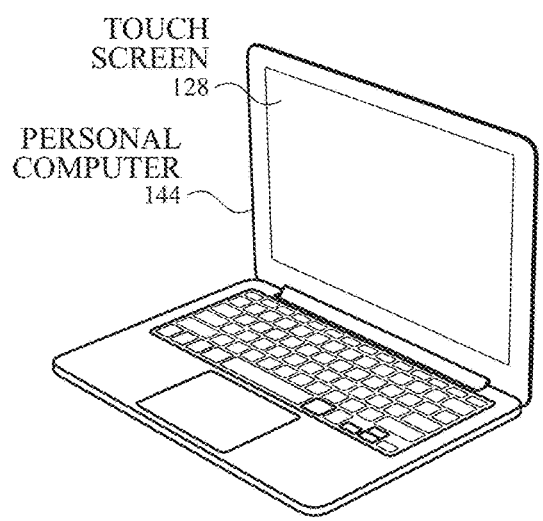
Figure 1D:
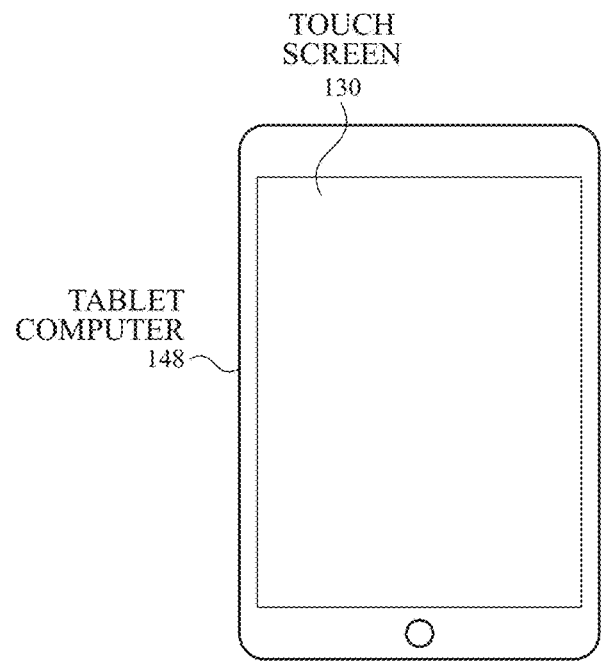
Figure 1E:
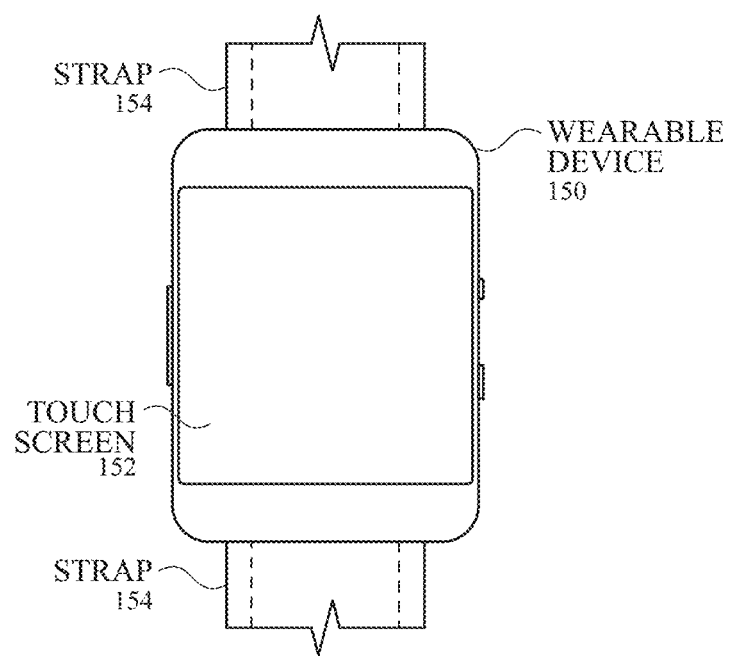

FIGS. 1A-1E illustrate example systems that can implement touch sensing (e.g., hover sensing) according to examples of the disclosure. FIG. 1A illustrates an example mobile telephone 136 that includes a touch screen 124 and a computing system that can implement touch sensing according to examples of the disclosure. FIG. 1B illustrates an example digital media player 140 that includes a touch screen 126 and a computing system that can implement touch sensing according to examples of the disclosure. FIG. 1C illustrates an example personal computer 144 that includes a touch screen 128 and a computing system that can implement touch sensing according to examples of the disclosure. FIG. 1D illustrates an example tablet computing device 148 that includes a touch screen 130 and a computing system that can implement touch sensing according to examples of the disclosure. FIG. 1E illustrates an example wearable device 150 that includes touch screen 152 and a computing system and can be attached to a user using a strap 154 and that can implement touch sensing according to examples of the disclosure. The touch screen and computing system that can implement touch sensing can be implemented in other devices.

Touch screens 124, 126, 128, 130 and 150 can be based on, for example, self-capacitance or mutual capacitance sensing technology, or another touch sensing technology. For example, a self-capacitance based touch system can include a matrix of small, individual plates of conductive material that can be referred to as touch node electrodes (as described below with reference to touch screen 420 in FIG. 4). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material (as described below with reference to touch screen 320 in FIG. 3), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 150 can be based on mutual capacitance. A mutual capacitance based touch system can include drive and sense lines that may cross over each other on different layers, or may be adjacent to each other on the same layer (e.g., as illustrated in touch screen 320 in FIG. 3). The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128, 130 and 150 can be based on mutual capacitance and/or self-capacitance. The electrodes can be arranged as a matrix of small, individual plates of conductive material (e.g., as in touch screen 420 in FIG. 4) or as drive lines and sense lines (e.g., as in touch screen 320 in FIG. 3), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
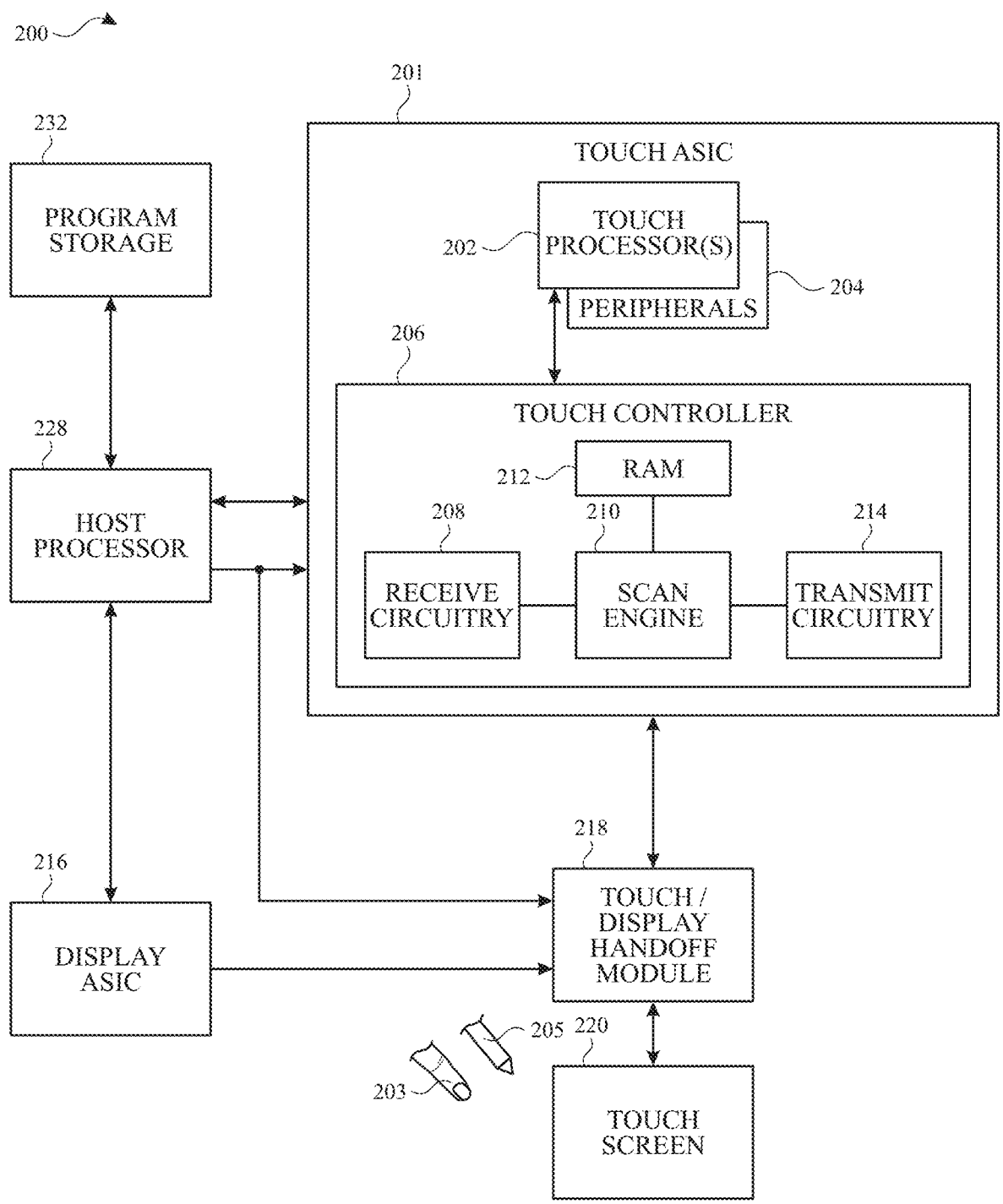
FIG. 2 illustrates a block diagram of an example computing system that can implement touch sensing according to examples of the disclosure.

FIG. 2 illustrates a block diagram of an example computing system that can implement touch sensing (e.g., hover sensing) according to examples of the disclosure. Computing system 200 could be included in, for example, mobile telephone 136, digital media player 140, personal computer 144, tablet computing device 148, wearable device 150, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, differential mutual capacitance scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels (e.g., described in more detail with respect to sense channel 780 in FIG. 7E). The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, an LED display interface, an OLED display interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, light emitting diode (LED) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signal. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
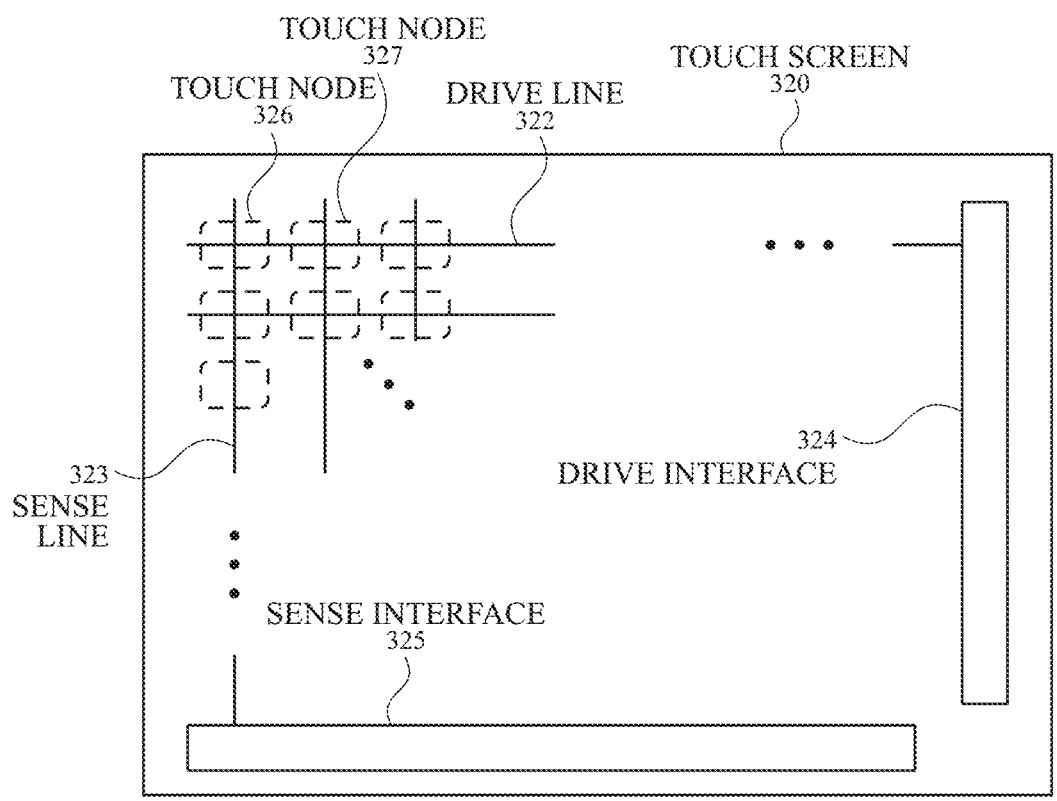
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be coupled to transmit circuitry and sense lines 323 can be coupled to receive circuitry. As used herein, an electrical component "coupled to" or "connected to" another electrical component encompasses a direct or indirect connection providing electrical path for communication or operation between the coupled components. Thus, for example, drive lines 322 may be directly connected to transmit circuitry or indirectly connected to sense circuitry via drive interface 324, but in either case an electrical path may be provided for driving stimulation signals to drive lines. Likewise, sense lines 323 may be directly connected to sense channels or indirectly connected to sense channels via sense interface 325, but in either case an electrical path may be provided for sensing the sense lines 323. Drive lines 322 can be driven by stimulation signals from the transmit circuitry 214 through a drive interface 324, and resulting sense signals generated in sense lines 323 can be transmitted through a sense interface 325 to sense channels in receive circuitry 208 in touch controller 206. In this way, drive lines and sense lines can be part of the touch sensing circuitry that can interact to form capacitive sensing nodes, which can be thought of as touch nodes, such as touch nodes 326 and 327. This way of understanding can be particularly useful when touch screen 320 is viewed as capturing an "image" of touch (or "touch image"). In other words, after touch controller 206 has determined whether a touch has been detected at each touch node in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, differential mutual capacitance scans, self-capacitance row and/or column scans, row-row mutual capacitance scans, column-column mutual capacitance scans, and stylus scans.

Figure 4:
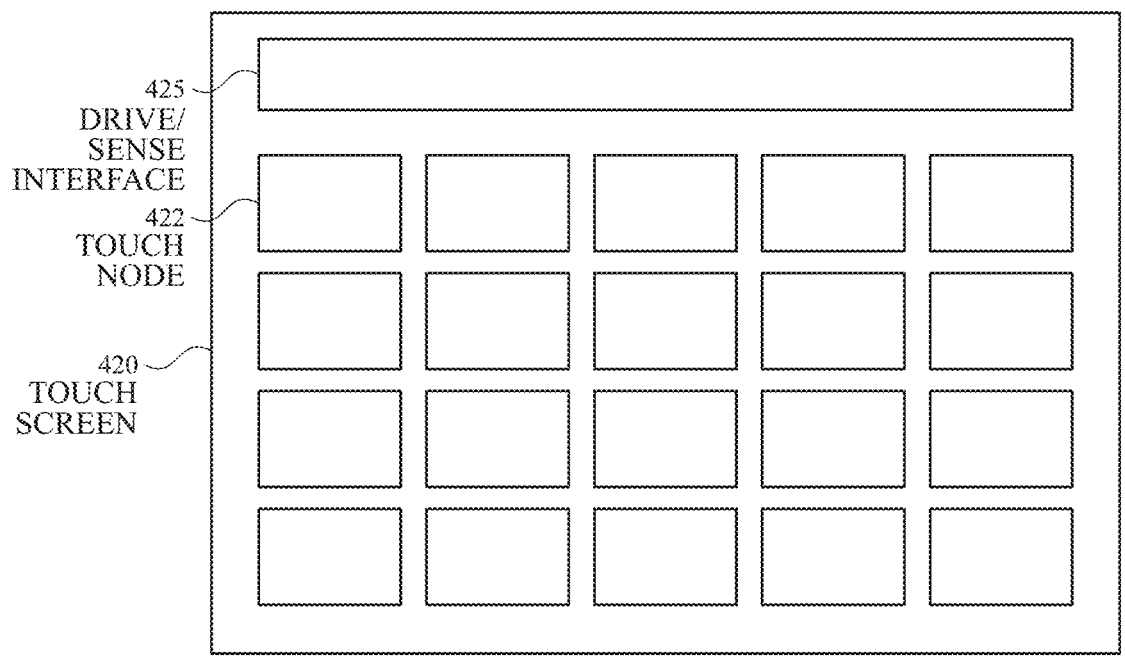
FIG. 4 illustrates an example touch screen including touch sensing circuitry configured as pixelated electrodes according to examples of the disclosure.

Additionally or alternatively, the touch screen can include touch sensing circuitry including an array of touch node electrodes arranged in a pixelated touch node electrode configuration. FIG. 4 illustrates an example touch screen including touch sensing circuitry configured as pixelated touch node electrodes according to examples of the disclosure. Touch screen 420 can include touch sensing circuitry that can include a plurality of individual touch node electrodes 422, each touch node electrode identifying or representing a unique location on the touch screen at which touch or proximity (i.e., a touch or proximity event) is to be sensed, and each touch node electrode being electrically isolated from the other touch node electrodes in the touch screen/panel. Touch node electrodes 408 can be on the same or different material layers on touch screen 420. In some examples, touch screen 420 can sense the self-capacitance of touch node electrodes 422 to detect touch and/or proximity activity on touch screen 420. For example, in a self-capacitance configuration, touch node electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch node electrodes 422) as "touch pixel" electrodes can be particularly useful when touch screen 420 is viewed as capturing an "image" of touch. In other words, after touch controller 206 has determined an amount of touch detected at each touch node electrode 422 in touch screen 420, the pattern of touch node electrodes in the touch screen at which a touch occurred can be thought of as an "image" of touch (e.g., a pattern of fingers or other objects touching the touch screen). In some examples, touch screen 420 can sense the mutual capacitance between touch node electrodes 422 to detect touch and/or proximity activity on touch screen 420 Although discussed herein primarily with reference to a row-column touch sensor panel (e.g., with reference to FIGS. 6 and 7A-7D), the principles of the touch sensing can be applied to a pixelated touch sensor panel configured to detect mutual capacitance. Additionally, although discussed herein primarily with reference to mutual capacitance based touch sensor panels, the principles of the touch sensing can be applied to other capacitance based touch sensor panels (e.g., self-capacitance based touch sensor panels), resistive touch sensor panels, and other types of touch sensor panels. Additionally, it should be understood that a force sensor panel can also be implemented using mutual capacitance sensing techniques. In some examples, force sensor panel can measure mutual capacitance between electrodes mounted on the backplane of the display and electrodes mounted on a proximate flex circuit. As force is exerted, the distance between the electrodes mounted on the backplane of the display and electrodes mounted on a proximate flex circuit can change the mutual capacitance coupling therebetween. The change in mutual capacitance can be measured to detect force applied to the touch screen.

Figure 5:
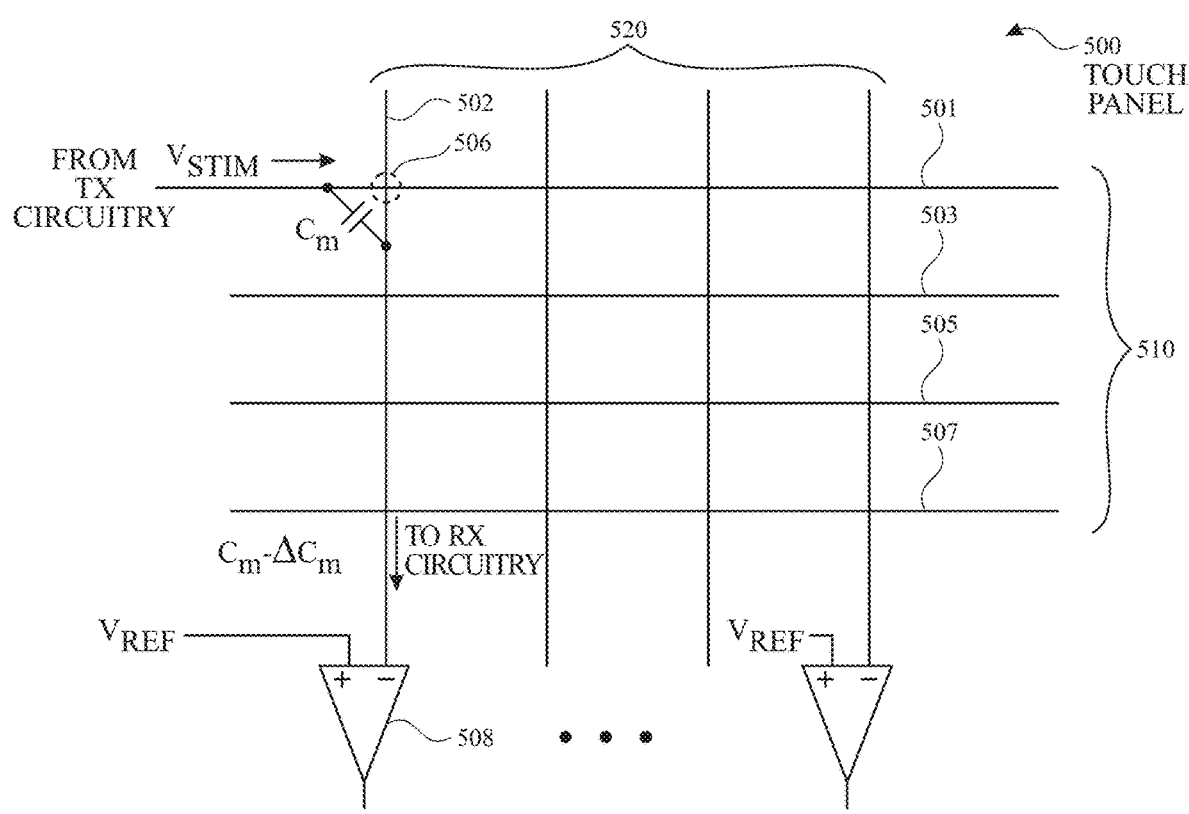
FIG. 5 illustrates an example mutual capacitance scan of an example row-column touch sensor panel.

FIG. 5 illustrates an example mutual capacitance scan of an example row-column touch sensor panel. Touch sensor panel 500 can include an array of touch nodes formed at the crossing points of row electrodes 510 and column electrodes 520. For example, touch node 506 can be formed at the crossing point of row electrode 501 and column electrode 502. During a single-stimulation mutual capacitance scan, a row electrode 501 (configured as a drive line) can be coupled to the transmit circuitry 214 which can stimulate the row electrode 501 with a drive signal ("Vstim"). One or more column electrodes (configured as sense lines) can be coupled to the receive circuitry 208 to sense mutual capacitance (or changes in mutual capacitance) between row electrode 501 and each of the one or more column electrodes. For each step of the single-stimulation mutual capacitance scan, one row electrode can be stimulated and the one or more column traces can be sensed. A touch node 506 can have a mutual capacitance Cm at the touch node 506 (between stimulated row electrode 501 and sensed column electrode 502) when there is no object touching or proximate to (e.g., within a threshold distance of) touch node 506. When an object touches or is proximate to the touch node 506 (e.g., a finger or stylus), the mutual capacitance Cm can be reduced by $\Delta$Cm, i.e., (Cm−$\Delta$Cm), corresponding to the amount of charge shunted through the object to ground. This mutual capacitance change can be sensed by sense amplifier 508 in the receive circuitry 208, which can be coupled to the column electrode 502 corresponding to touch node 506, to sense a touch signal that can be used to indicate the touch or proximity of an object at touch node 506. The sensing described with respect to touch node 506 can be repeated for the touch nodes of the touch sensor panel to generate an image of touch for the touch sensor panel (e.g., in subsequent single-stimulation mutual capacitance steps different row electrodes, such as row electrodes 503, 505, and 507, can be stimulated). In examples with a dedicated sense amplifier 508 for each column electrode (sense line) and N row electrodes (drive lines), the touch image for the touch sensor panel can be generated using N single-stimulation mutual capacitance scan steps.

In some examples, rather than using a single-stimulation mutual capacitance scan, the row-column touch sensor panel 500 can be stimulated using a multi-stimulation ("multi-stim") mutual capacitance scan. In multi-stim scan, multiple drive lines (e.g., row electrodes 510) can be simultaneously stimulated with different stimulation signals for multiple stimulation steps, and the sense signals generated at one or more sense lines (e.g., column electrodes 520) in response to the multiple stimulation steps can be processed to determine the presence and/or amount of touch for each touch node in the touch sensor panel (corresponding to the multiple drive lines). For example, FIG. 5 illustrates four row electrodes 510 and four column electrodes 520. In some examples, each of the four row electrodes 510 can be stimulated with a drive signal Vstim, but the phases of the drive signals applied to the drive lines can be different for four stimulation steps. In some examples, the drive signal can be in-phase (Vstim+, 0° phase) or out-of-phase (Vstim−, 180° phase). For example, the polarities of the stimulation signals (e.g., cosine of the phase) for two example multi-stim scans can be represented by Table 1 or Table 2:

TABLE 1

|  | Step 1 | Step 2 | Step 3 | Step 4 |
| --- | --- | --- | --- | --- |
| Row 501 | + | + | + | + |
| Row 503 | + | + | − | − |
| Row 505 | + | − | − | + |
| Row 507 | + | − | + | − |

TABLE 2

|  | Step 1 | Step 2 | Step 3 | Step 4 |
| --- | --- | --- | --- | --- |
| Row 501 | − | + | − | + |
| Row 503 | + | + | − | − |
| Row 505 | + | − | + | − |
| Row 507 | − | − | + | + |

For each sense line and for each step, the sensed signal can include contributions from the four drive lines (e.g., due to the capacitive coupling between the four drive lines and the sense line), encoded based on the polarity of the stimulation signal. At the end of the four steps, four sensed signals for a respective sense line can be decoded based on the stimulation phases to extract the capacitive signal for each touch node formed by one of the drive lines and the respective sense line. For example, assuming a linear system, the sensed signal for a sense line for each scan step can be proportional to the total signal charge, $Q_{sig\_tot}$, which can be equal to the sum of the product of the stimulation voltage and the touch node capacitance for each touch node of the sense line. Mathematically, this can be expressed for step S by equation (1) as:

$$Q_{sig\_tot}(S) = \Sigma_{i=0}^{M-1} \text{stim}_i(S) \cdot C\text{sig}_i \quad (1)$$

where Vstim can represent the stimulation voltage indexed for drive line (row electrode) i and step S and Csig can represent the capacitance at each touch node for the sense line indexed for corresponding drive line (row electrode) i and M is the total number of drive lines. In vector form, the above expression can be rewritten in equation (2) as:

$$\tilde{Q}_{sig\_tot} = V\text{stim} \cdot \tilde{M} \cdot \tilde{C}\text{sig} \quad (2)$$

where $\tilde{Q}_{sig\_tot}$ can represent a vector of the sensed signals from each scan step of the multi-stim scan, Vstim can represent a constant stimulation voltage, $\tilde{M}$ can represent a matrix of polarities of the stimulation voltage (stimulation matrix) indexed by row and step (e.g., as shown in Table 1 or Table 2 above), and $\tilde{C}$sig can represent a vector of the capacitance at each touch node for the sense line. The capacitance value at each touch node of the sense line can be decoded using equation (3):

$$\tilde{C}\text{sig} = \frac{\tilde{M}^{-1}}{V\text{stim}} \cdot \tilde{Q}_{sig\_tot} \quad (3)$$

where $\tilde{M}^{-1}$ can represent the inverse of stimulation matrix. Repeating the measurements and calculations above for each sense line can determine a capacitance signal for each touch node of the touch sensor panel scanned during the multi-stim scan. Although the multi-stim scan described above with respect to FIG. 5 includes four scan steps, it should be understood that the total duration of all four scan steps of the multi-stimulation scan can be the same duration as each scan step of the single-stimulation scan without any reduction in the integration time for sensing the capacitive signal at each touch node. Additional discussion of multi-stimulation touch sensing can be found in U.S. Pat. No. 7,812,827 entitled "Simultaneous Sensing Arrangement" by Steve Hotelling, et al. (filed Jan. 3, 2007) and in U.S. Pat. No. 8,592,697 entitled "Single-Chip Multi-Stimulus Sensor Controller" by Steve Hotelling, et al. (filed Sep. 10, 2008) both of which are incorporated by reference herein.

Figure 6:
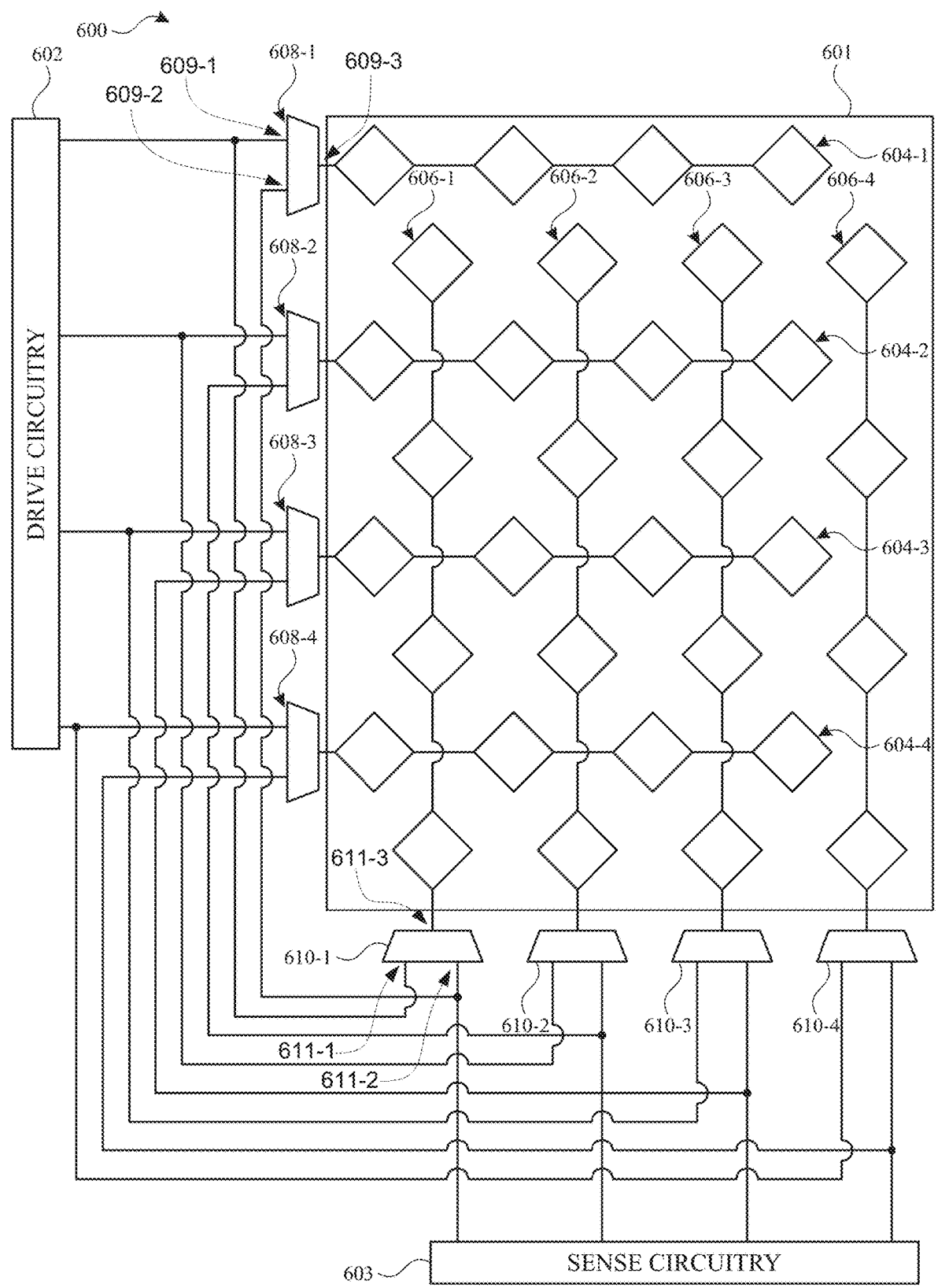
FIG. 6 illustrates an example touch screen system according to examples of the disclosure.

FIG. 6 illustrates an example touch screen system 600 according to examples of the disclosure. In some embodiments, touch screen system 600 includes a touch screen 601, drive circuitry 602, sense circuitry 603, and one or more multiplexers 608 and 610. In some examples, touch screen 601 can include patterned touch electrodes (e.g., row touch electrodes and column touch electrodes) configured for measuring touch (or proximity) of an object to touch screen 600. In FIG. 6, touch screen 601 includes four rows of touch electrodes 604-1, 604-2, 604-3, and 604-4 and four columns of touch electrodes 606-1, 606-2, 606-3, and 606-4. As shown, each touch electrode in a column of touch electrodes are electrically coupled and each touch electrode in a row of touch electrodes are electrically coupled. It is understood that the number of rows and columns are merely exemplary and a touch screen can have more or fewer rows or columns of touch electrodes. It is also understood that the shape of the touch electrodes shown in FIG. 6 are merely exemplary and need not be diamond shaped.

In some examples, any of the rows and/or columns of touch electrodes can be configured as drive or sense electrodes based on the switching states of one or more multiplexers. In FIG. 6A, each row and each column of touch electrodes has an associated multiplexer for controlling what circuitry is coupled to the corresponding row or column of touch electrodes. For example, row multiplexer 608-1 is coupled to row 604-1 such that row multiplexer 608-1 controls whether row 604-1 is coupled to drive circuitry 602 or sense circuitry 603. Similarly, column multiplexer 610-1 is coupled to column 606-1 and controls whether column 606-1 is coupled to drive circuitry 602 or sense circuitry 603.

As shown in FIG. 6, each multiplexer can be a bi-directional 2:1 multiplexer (e.g., an analog multiplexer, a multidirectional multiplexer, etc.). For example, multiplexer 608-1 has two input ports 609-1 and 609-2 and one output port 609-3. Input port 609-1 of row multiplexer 608-1 is coupled to drive circuitry 602 such that if multiplexer 608-1 is set to "select" input port 609-1, then output port 609-3 of row multiplexer 608-1, which is coupled to row 604-1, is coupled to drive circuitry 602 (e.g., drive circuitry 602 can then drive row 604-1). On the other hand, input port 609-2 of row multiplexer 608-1 is coupled to sense circuitry 603 such that if row multiplexer 608-1 is set to "select" the input port 609-2, then output port 609-3 of row multiplexer 608-1 is coupled to sense circuitry 603 (e.g., row 604-1 can provide signals to sense circuitry 603). Row multiplexers 608-2, 608-3, and 608-4 are coupled to row 604-2, 604-3, 604-4 and the drive and sense circuitries similarly.

In some examples, certain rows and/or columns can share the same drive line and/or sense lines. For example, input port 611-1 of column multiplexer 610-1 is coupled to the same drive line as input port 609-1 of row multiplexer 608-1. Thus, in some embodiments, if row multiplexer 608-1 and column multiplexer 610-1 are both set to "select" the first input port (e.g., input port 609-1 and input port 611-1, respectively), then both row 604-1 and column 606-1 are driven by the same signal from drive circuitry 602. In some examples, input port 611-2 of column multiplexer 610-1 is coupled to sense circuitry 603 such that if column multiplexer 610-1 is set to "select" input port 611-2, then output port 611-3 of column multiplexer 610-1 is coupled to sense circuitry 603 (e.g., column 606-1 can provide signals to sense circuitry 603). In some examples, input port 611-2 of column multiplexer 610-1 is coupled to the same sense line as input port 609-2 of row multiplexer 608-1. Thus, in some embodiments, if row multiplexer 608-1 and column multiplexer 610-1 are both set to "select" the second port (e.g., input port 609-2 and input port 611-2, respectively), then both row 604-1 and column 606-1 provide sense signals to sense circuitry 603 on the same sense line. Column multiplexers 610-2, 610-3, and 610-4 are coupled to columns 606-2, 606-3, 606-4 and the drive and sense circuitries similarly. Thus, as shown above, each row of touch electrodes can have a corresponding column of touch electrodes that can be configured to be coupled to the same drive and sense lines. It is understood, however, that each row and/or column of touch electrodes can have their own dedicated sense and drive lines (e.g., does not share drive or sense lines with another row or column). In some embodiments, sharing drive and/or sense lines can reduce the area requirements of touch screen system 600, while having dedicated drive and/or sense lines can increase flexibility in driving and/or sensing touch panel 601. Thus, as described above, touch screen system 600 allows any of the row or column electrodes to be configured as drive electrodes or sense electrodes.

FIGS. 7A-7D illustrate a method of operating touch panel 700 according to examples of the disclosure. In FIGS. 7A-7D, touch panel 700 is configured in a mutual capacitance sense mode. As described above, when detecting touch activity, the electromagnetic field generated at the intersection of a drive and sense electrode can be limited to the volume immediately around the respective intersection. As a result, the ability for conventional touch panels to reliably sense hovering objects is minimal. Thus, FIGS. 7A-7D illustrate a method of simultaneously driving multiple rows and/or columns to increase the electromagnetic field penetration to improve detection of hovering objects. FIGS. 7A-7D illustrate four sequential scan steps to generate a full touch image.

Figure 7A:
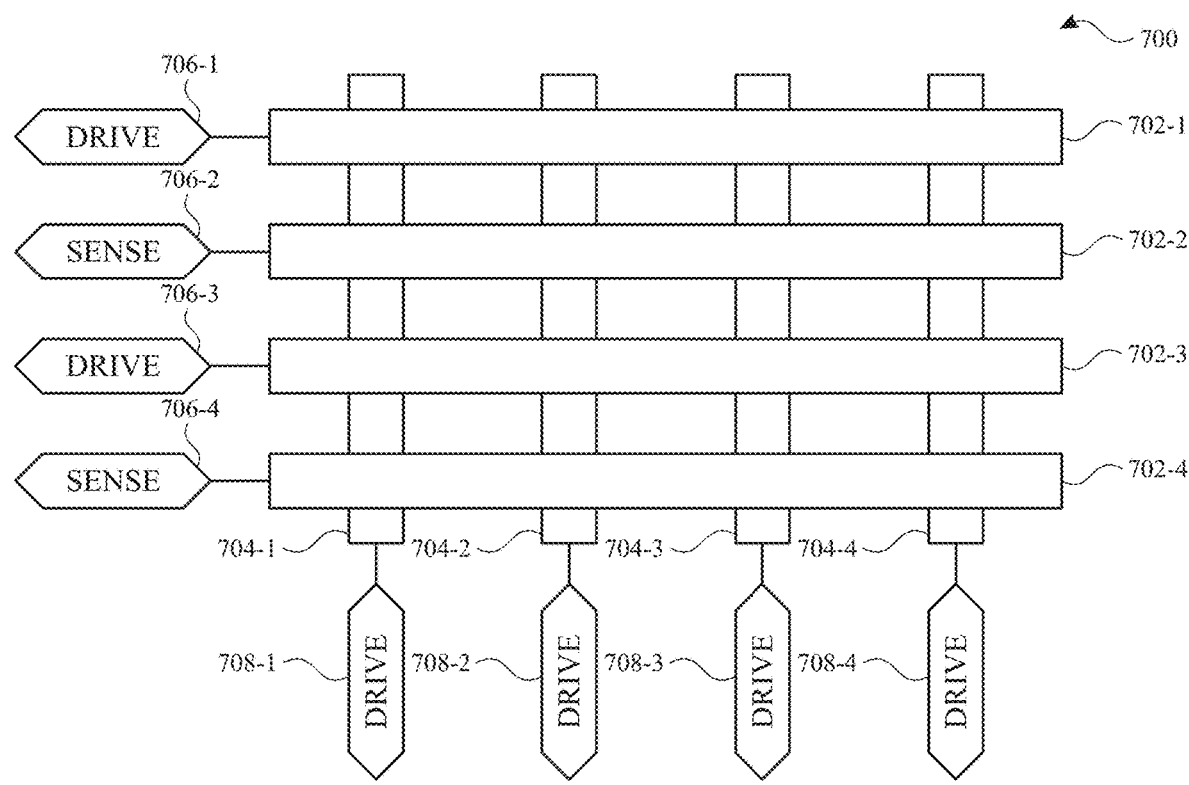
FIGS. 7A-7D illustrate an exemplary method of operating a touch panel according to examples of the disclosure.

In FIG. 7A, touch panel 700 includes row electrodes 702-1, 702-2, 702-3, and 702-4, and column electrodes 704-1, 704-2, 704-3, and 704-4. In FIG. 7A, the row and column electrodes are illustrated as rectangular rows and columns for simplicity, but it is understood that the row and columns can be either a single element as shown, or multiple elements that are electrically coupled together (such as shown in FIG. 6). Furthermore, the row electrodes can be coupled along a horizontal direction (e.g., each electrode in a row can be coupled to the next adjacent electrode) and the column electrodes can be coupled together along a vertical direction (e.g., each electrode in a column can be coupled to the next adjacent electrode), as shown in FIG. 7A. Thus, touch panel 700 can be similar to touch panel 601 described above with respect to FIG. 6.

In FIG. 7A, row 702-1 is coupled to drive/sense node 706-1, row 702-2 is coupled to drive/sense node 706-2, row 702-3 is coupled to drive/sense node 706-3, and row 702-4 is coupled to drive/sense node 706-4. Column 704-1 is coupled to drive/sense node 708-1, column 704-2 is coupled to drive/sense node 708-2, column 704-3 is coupled to drive/sense node 708-3, and column 704-4 is coupled to drive/sense node 708-4. In some examples, the drive/sense nodes shown in FIG. 7A are a simplified illustration of the multiplexer circuitry described above with respect to FIG. 6. Thus, if a respective drive/sense node is described herein as being configured to be driven or sensed, it is understood that the corresponding multiplexers for the respective row or column are set to select the respective ports to enable the respective row or column to be driven or sensed (e.g., coupled to drive or sense circuitry), respectively.

FIG. 7A illustrates a first scan step of simultaneously driving multiple rows and/or columns to increase the electromagnetic field penetration to improve detection of hovering objects. In FIG. 7A, rows 702-1 and 702-3 and columns 704-1, 704-2, 704-3, and 704-4 are driven by drive/sense nodes 706-1, 706-3, 708-1, 708-2, 708-3, and 708-4, respectively, while rows 702-2 and 702-4 are sensed by drive/sense nodes 706-2 and 706-4, respectively. Thus, in the first scan step, all columns of touch electrodes are driven while every other row of touch electrodes (e.g., non-adjacent rows) are driven and the remaining rows are sensed. Thus, for each row of electrodes that is being sensed, two adjacent rows of electrodes are being simultaneously driven and the column electrodes are being driven. Thus, instead of only have a single drive element for each sense element, each sense element has multiple drive elements. In this way, the electromagnetic field penetration is increased due to the number of elements being driven, thus allowing for an object hovering over touch panel 700 to be detected. In some embodiments, performing the above-described first scan step provides the system with a partial touch image (e.g., every other row, such as the odd rows).

Figure 7B:
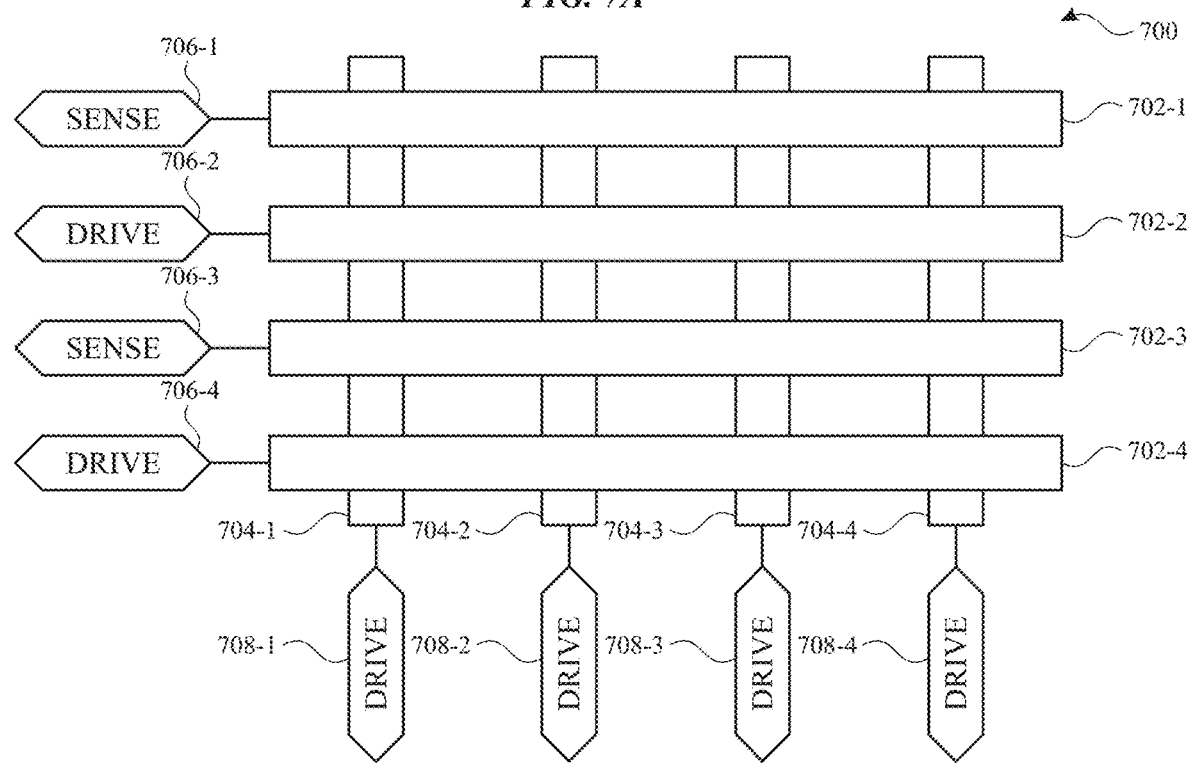

FIG. 7B illustrates a second scan step of simultaneously driving multiple rows and/or columns to increase the electromagnetic field penetration to improve detection of hovering objects. In FIG. 7B, rows 702-2 and 702-4 and columns 704-1, 704-2, 704-3, and 704-4 are driven by drive/sense nodes 706-2, 706-4, 708-1, 708-2, 708-3, and 708-4, respectively, while rows 702-1 and 702-3 are sensed by drive/sense nodes 706-1 and 706-3, respectively. Thus, in the second scan step, all columns of touch electrodes remain driven while the rows that were driven in the first scan step are now scanned and the rows that were scanned are now driven. Thus, the second scan step scans the rows of touch electrodes that were not scanned in the first scan step. In this way, the partial touch image from the first scan step (e.g., the odd rows) and the partial touch image from the second scan step (e.g., the even rows) can be combined to generate a touch image in which every row has been scanned.

Figure 7C:
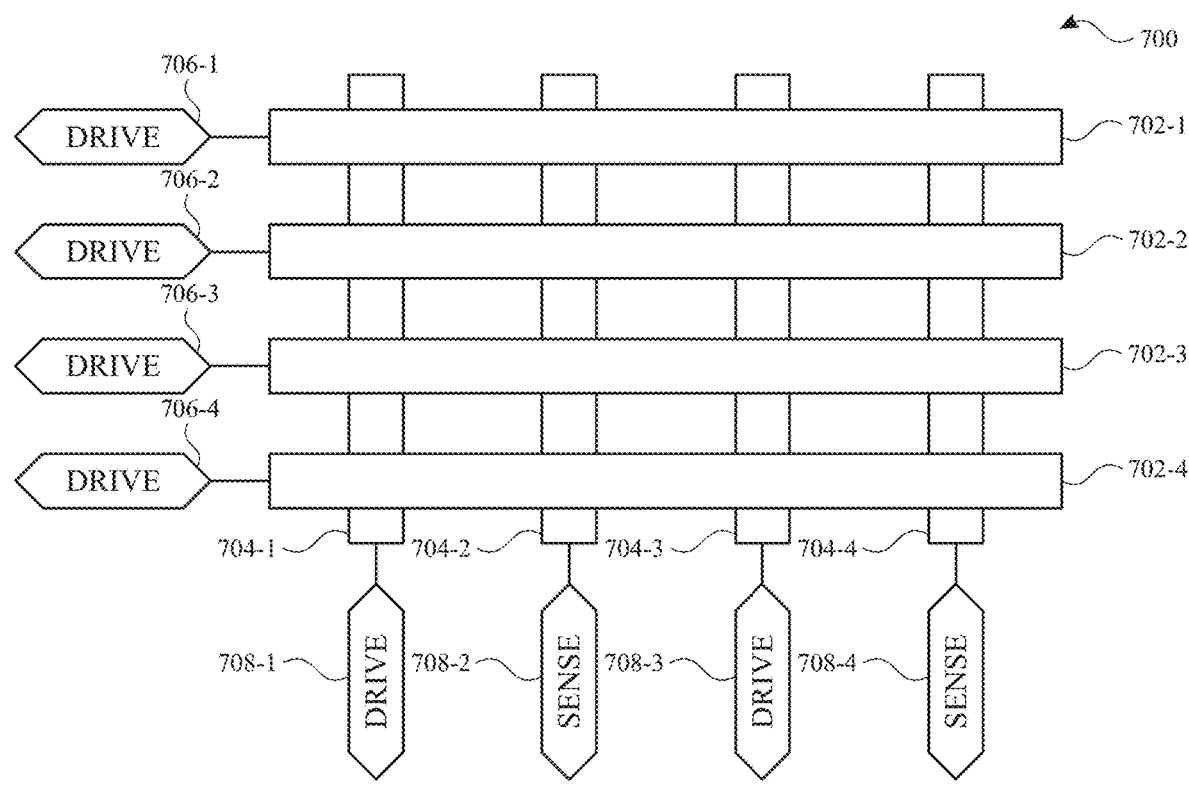
Figure 7D:
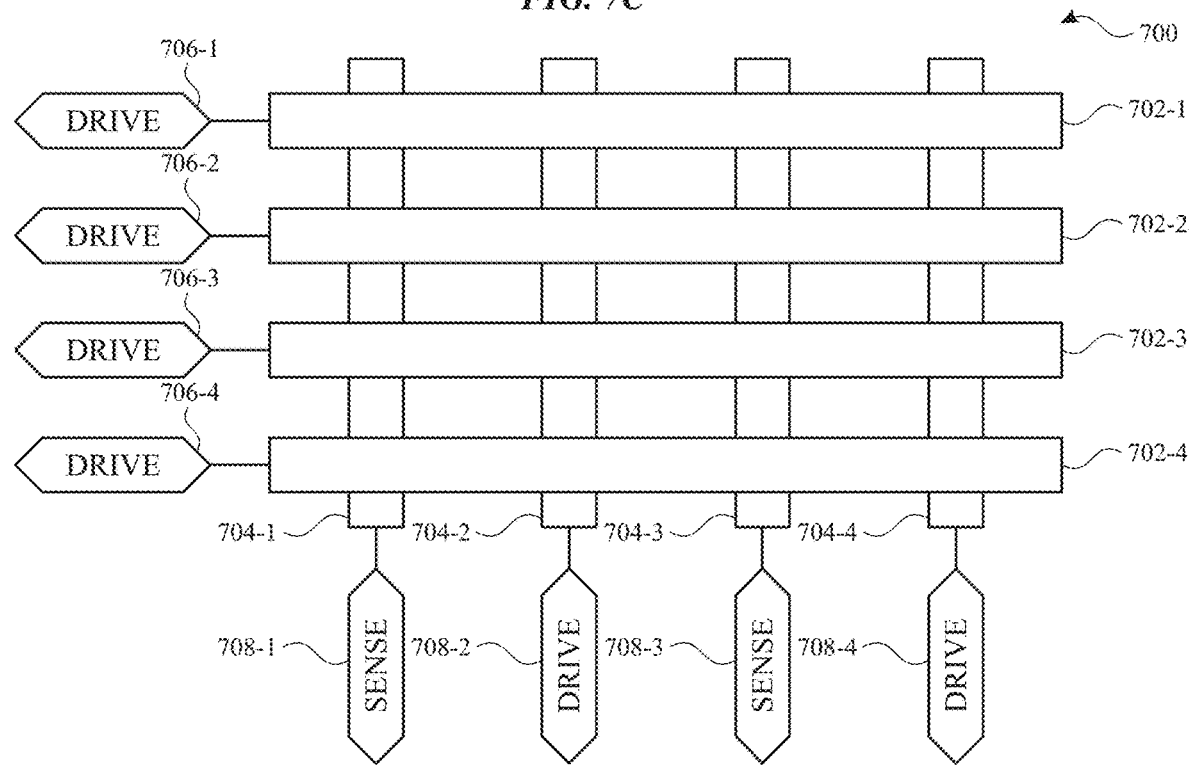

FIGS. 7C-7D illustrate a third and fourth scan step in which the drive/sense scheme of the rows and columns are swapped. FIG. 7C illustrates a third scan step of simultaneously driving multiple rows and/or columns to increase the electromagnetic field penetration to improve detection of hovering objects. In FIG. 7C, rows 702-1, 702-2, 702-3, and 702-4 are all driven (by drive/sense nodes 706-1, 706-2, 706-3, and 706-4, respectively), while columns 702-2 and 702-4 are sensed (by drive/sense nodes 708-2 and 708-4, respectively) and columns 702-1 and 702-3 are driven (by drive/sense nodes 708-1 and 708-3, respectively. Thus, similarly to the first scan step described above with respect to FIG. 7A, every row is driven while every other column are driven (e.g., non-adjacent columns) and the remaining columns are sensed. In some embodiments, performing the above-described third scan step provides the system with a partial touch image (e.g., the odd columns).

FIG. 7D illustrates a fourth scan step of simultaneously driving multiple rows and/or columns to increase the electromagnetic field penetration to improve detection of hovering objects. In FIG. 7D, rows 702-1, 702-2, 702-3, and 702-4 are all driven (by drive/sense nodes 706-1, 706-2, 706-3, and 706-4, respectively), while columns 702-1 and 702-3 are sensed (by drive/sense nodes 708-1 and 708-3, respectively) and columns 702-2 and 702-4 are driven (by drive/sense nodes 708-2 and 708-4, respectively. In some embodiments, performing the above-described fourth scan step provides the system with a partial touch image (e.g., the even columns). In this way, the partial touch image from the third scan step (e.g., the odd columns) and the partial touch image from the fourth scan step (e.g., the even columns) can be combined to generate a touch image in which every column has been scanned. In some embodiments, combining the partial touch images of all scan steps generates a full touch image in which every row and column is scanned. Performing the above four scan steps provides a full resolution touch image, but the increased number of drive elements increases the sensitivity of the touch electrodes (e.g., improving the signal to noise ratio), thereby enabling the touch panel to better detect touch and hover activities.

In some examples, instead of driving and sensing every other row and/or column of touch electrodes as described above with respect to FIGS. 7A-7D, a single row or column can be sensed while all other rows and columns can be driven. In some embodiments, driving every row and column except for one row significantly increases the electromagnetic field penetration by maximizing the number of drive elements. In some embodiments, to achieve a full touch image, multiple scans are required such that each row and column is sensed (e.g., for a total of n+m number of scans, where n is the number of rows and m is the number of columns).

It is understood that a full resolution touch image may not be necessary and in some examples, scanning every other row or column, or scanning every third row or column can achieve a touch image with a sufficiently high resolution to determine whether there is touch or hover activity. Similarly, it is understood that the every-other-row and every-other-column scheme discussed above can be modified to be one scan element out of every three elements, or one every four, one every five, etc.

In some examples, as discussed above, rather than using a single-stimulation mutual capacitance scan (e.g., each driven row or column is driven by the same signal or signals that have the same phase and/or amplitude), the row-column touch sensor panel can be stimulated using a multi-stimulation ("multi-stim") mutual capacitance scan. As discussed above, in a multi-stim scan, multiple drive lines (e.g., row electrodes or column electrodes) can be simultaneously stimulated with different stimulation signals for multiple stimulation steps, and the sense signals generated at one or more sense lines (e.g., the undriven row or column electrodes) in response to the multiple stimulation steps can be processed to determine the presence and/or amount of touch for each touch node in the touch sensor panel (corresponding to the multiple drive lines).

In some embodiments, because multi-stim scan inherently drive multiple rows or columns simultaneously, multi-stim scan techniques can be used in conjunction with the multiple drive technique discussed above with respect to FIGS. 7A-7D to improve the detection sensitivity of the touch panel. Table 3 in FIG. 11 illustrates an example multi-scan scan sequence in which columns of electrodes are driven by a drive signal that is in-phase (Vstim+, 0° phase) or out-of-phase (Vstim−, 180° phase). In the example illustrated in Table 3, the touch panel has ten columns of touch node electrodes and the entirety of the column is driven by an in-phase signal, an out-of-phase signal, or no signal (e.g., 0 voltage, reference voltage, ground voltage, guard voltage, etc.). In some embodiments, the row electrodes are sensed while the columns are driven as shown in Table 3.

As shown in Table 3 of FIG. 11, a touch panel can be divided evenly among a number of groups (e.g., "banks") and each column within a group can be "ganged" (e.g., coupled together such that they are driven by the same drive signal). As shown, a touch panel with ten column electrodes can be divided into three groups such that each group includes three columns and a fourth overflow group. In Table 3, each group is shaded (or not shaded, as the case may be) for ease of illustration. In some examples, each column electrode in each group is driven while the overflow group is not driven (e.g., 0 voltage, reference voltage, ground voltage, guard voltage, etc.). Because the touch panel is divided into three groups, each group is subjected to three scan steps (e.g., the number of groups). In some examples, during the first scan step, the first group is driven with Vstim− (e.g., out-of-phase drive signal) while the second and third groups are driven with Vstim+ (e.g., in-phase drive signal). During the second scan step, the first and third groups are driven with Vstim+ while the second group is driven with Vstim−. During the third scan step, the first and second groups are driven with Vstim+ while the third group is driven with Vstim−. Thus, each group is driven by Vstim− during the first set of scan steps.

During the second set of scan steps (e.g., scan steps 4-6), the groups of electrodes are shifted by one. For example, the first group is now composed of columns 2, 3, and 4; the second group is now composed of columns 5, 6, and 7, and the third group is now composed of columns 8, 9, and 10; and the overflow group is composed of column 1. During the second set of scan steps, the groups are subject to the same sequence of drive signals as during the first set of scan steps (e.g., each group is driven by Vstim− once). As shown in Table 3, the groups "wrap" such that the overflow group shifted from including column 10 to including column 1.

During the third set of scan steps (e.g., scan steps 7-9), the groups of electrodes are shifted by one again. For example, the first group is now composed of columns 3, 4, and 5; the second group is now composed of columns 6, 7, and 8, and the third group is now composed of columns 9, 10, and 1; and the overflow group is composed of column 2. During the third set of scan steps, the groups are subject to the same sequence of drive signals as during the first set of scan steps (e.g., each group is driven by Vstim− once). As shown in Table 3, the groups "wrap" such that the third group shifted from including columns 8-10 to including columns 9, 10, and 1, and the overflow group shifted from including column 1 to including column 2.

In the fourth set of scan steps (e.g., scan step 10), a common mode scan is performed in which each column of touch electrodes is driven by the Vstim+ signal. Thus, as described above, within each grouping, three scans per set are performed (e.g., the number of columns in each group, resulting in three scans per set), and each group is shifted three times (e.g., the number of groups, resulting in four sets of scans). As shown, if the number of columns does not divide evenly into the number of groups, then an overflow group of columns can be used which is not driven by either Vstim+ or Vstim−.

After performing the four sets of scan steps described above, the sensed signal generated at the row electrodes can be modeled using equation (4):

$$\tilde{Q} = \tilde{B} \cdot \tilde{C} \qquad (4)$$

where $\tilde{Q}$ is a vector with a length of four (e.g., the number of sets of scans) of the sensed signals from each scan step of the multi-stim scan, $\tilde{B}$ is a 4×4 matrix of polarities of the stimulation voltage (e.g., stimulation matrix) indexed by column and step (e.g., as shown in Table 3 in FIG. 11), and $\tilde{C}$ is a vector with a length of four (e.g., the number of sets of scans) at each touch node for the sense line. The capacitance value at each touch node of the sense line can then be decoded using equation (5):

$$\tilde{C} = \tilde{B}^{-1} \cdot \tilde{Q} \qquad (5)$$

where $\tilde{B}^{-1}$ represents the inverse of the stimulation matrix. Repeating the measurements and calculations above for each sense line can determine a capacitance signal for each touch node of the touch sensor panel scanned during the multi-stim scan. Thus, as shown, the equations for decoding the multi-stim scan described herein are similar to those described above with respect to equations 1-3. In this way, the system is able to determine the amount of capacitance at each touch node while simultaneously being able to drive multiple adjacent columns with the same drive signal (e.g., each column in a group), thus increasing the electromagnetic field penetration of the generated electromagnetic fields and improving the detection sensitivity of the touch panel. It is understood that the stimulus matrix illustrated in Table 3 of FIG. 11 is merely exemplary and any sized matrix can be used (e.g., any number of rows and/or any number of columns).

Figure 8A:
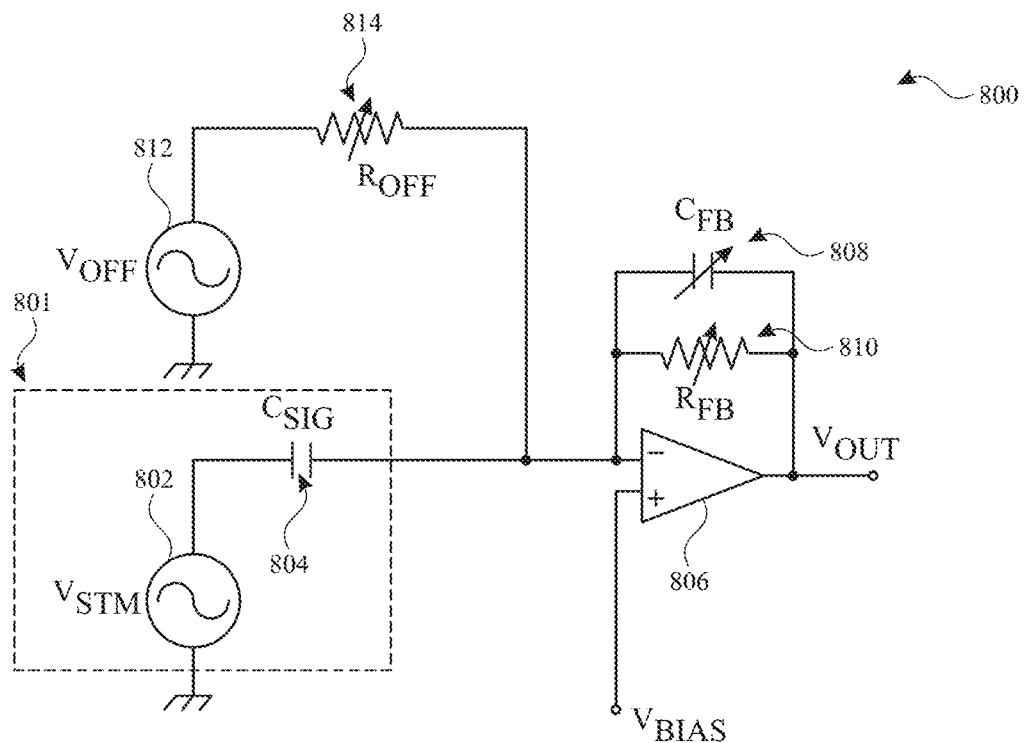
FIGS. 8A-8B illustrates exemplary touch sensor circuits according to examples of the disclosure.
Figure 8B:
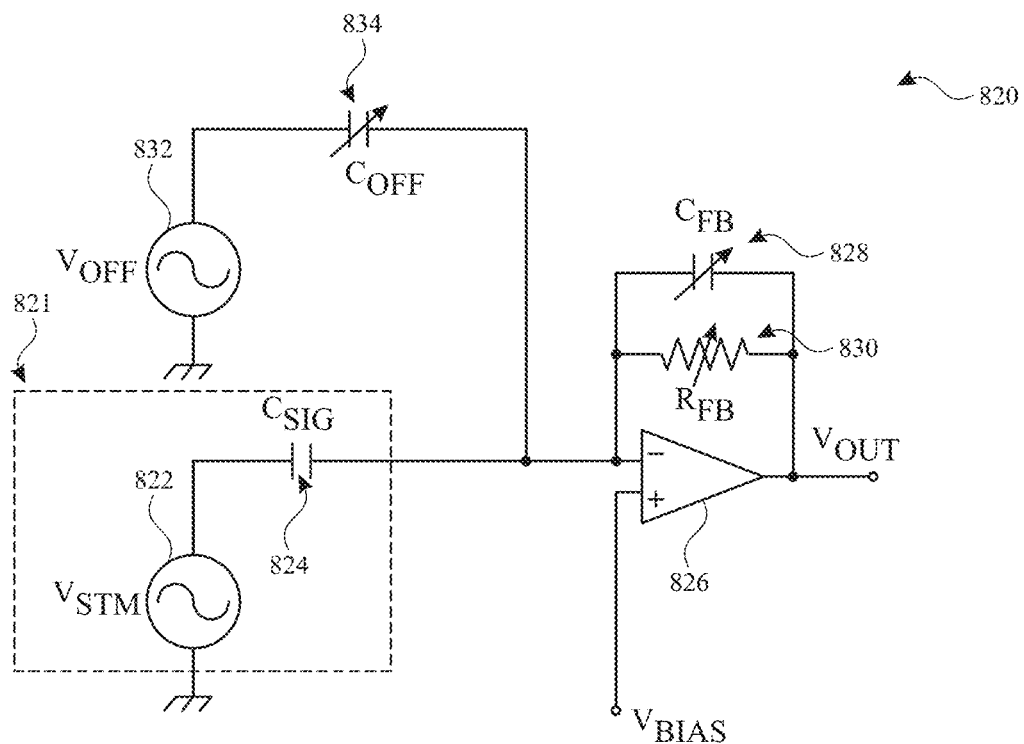

FIGS. 8A-8B illustrate exemplary touch sensor circuits according to examples of the disclosure. As discussed above, a touch sensor circuit is able to sense the total capacitance between one or more drive electrodes and a sense electrode. In some examples, the total capacitance comprises a baseline component and an interaction component. The baseline component is the amount of capacitance when the touch panel experiences no touch or hover activity. In some examples, the baseline capacitance is the amount of capacitance inherent in the design of the system. In some embodiments, the baseline capacitance can drift over time as changes in the environment cause the amount of baseline capacitance to change (e.g., temperature, humidity, noise from components of the device, noise in the environment, etc.). In some examples, the interaction component is the change in the capacitance due to a user's interaction with the touch panel (e.g., touch the touch sensor panel or hovering over the touch sensor panel). In some embodiments, the interaction component is dynamic and changes based on how close or far the object is to the touch panel, how well grounded the object is, the type of material of the object, and other such factors that affect the conductivity of the object. FIGS. 8A-8B illustrate exemplary systems and methods for injecting an offset signal to offset the effects of the baseline capacitance, thereby improving the signal to noise ratio and sensitivity of the touch sensor panel.

FIG. 8A illustrates an exemplary touch sensor circuit 800 according to examples of the disclosure. In some examples, touch sensor circuit 800 receives a touch sense signal from one or more touch electrodes on a touch panel, amplifies and/or buffers the touch sense signal, and transmits the touch sense signal for further processing, such as by touch processor 202. In some examples, components of touch sensor circuit 800 are integrated with touch controller 206. In some embodiments, touch sensor circuit 800 includes touch panel 801. In some examples, touch panel 801 is a touch sensitive surface similar to touch screen 220, touch screen 320, touch screen 420, and/or touch panel 500.

As shown in FIG. 8A, touch panel 801 is a circuit model of a touch sensor panel (e.g., touch screen 220, touch screen 320, touch screen 420, and/or touch panel 500). It is understood that the components in touch panel 801 are a simplified representation of a touch panel. In some examples, touch panel 801 includes a stimulation source 802 that generates stimulation signal $V_{STM}$. In some examples, stimulation source 802 provides a stimulation signal (e.g., drive signal) to one or more touch electrodes on a touch panel. In some examples, the one or more touch electrodes on the touch panel receive the stimulation signal from stimulation source 802. As shown in FIG. 8A, the one or more touch electrodes can be modeled as capacitor 804 having a capacitance $C_{SIG}$ (e.g., the baseline capacitance between one or more drive electrodes and one or more sense electrodes in a mutual capacitance sensing scheme and the capacitance caused by an object interacting with the touch panel). In some examples, touch panel 801 outputs a touch signal that is based on the total capacitance sensed by capacitor 804. In some embodiments, the touch panel outputs a touch sense current, $I_{IN}$, which includes a baseline current component, $I_{BASE}$, and touch current component, $I_{TOUCH}$. In some examples, the touch current component varies (e.g., increases or decreases) the total output current and can be modeled as the delta change in the current due to the touch or hover activity.

In FIG. 8A, touch sensor circuit 800 includes amplifier 806. In some embodiments, touch sensor circuit 800 includes feedback capacitor 808 and/or feedback resistor 810. As shown in FIG. 8A, amplifier 806 is an operational amplifier and/or a differential amplifier including an inverting input port, a noninverting input port, and an output port. Amplifier 806 amplifies the difference between the signal on the inverting input port and the signal on the noninverting input port and outputs the amplified difference to the output port. For example, if the noninverting input port of amplifier 806 is coupled to a reference voltage, such as system ground, then amplifier 806 amplifies the signal on the inverting input port with respect to ground. In FIG. 8A, the noninverting input port of amplifier 806 is coupled to a bias voltage VBIAS and the inverting input port of amplifier 806 is coupled to the output of touch panel 801. Thus, in some embodiments, amplifier 806 receives and amplifies a touch signal received from touch panel 801. In some embodiments, amplifier 806 outputs an amplified touch signal, which is forwarded for further processing (e.g., such as by touch processor 202, to determine whether there is any touch or hover activity, the magnitude of the activity, the location of the activity, or any other relevant characteristics).

In some embodiments, feedback capacitor 808 and feedback resistor 810 are coupled in parallel, forming a feedback network coupled between the output port of amplifier 806 and the inverting input port of amplifier 806. In some examples, the values of feedback capacitor 808 and feedback resistor 810 control the amplification characteristics of amplifier 806 (e.g., gain, frequency response, etc.). In some examples, feedback capacitor 808 and feedback resistor 810 are fixed components. In some examples, feedback capacitor 808 and feedback resistor 810 are variable components that can be adjusted at manufacture time (e.g., calibrated static components) or adjusted during runtime (e.g., dynamic components).

In some examples, touch sensor circuit 800 includes offset generator 812 and offset resistor 814. In some embodiments, offset resistor 814 is a variable resistor. In some embodiments, offset resistor 814 can be used to match the output impedance of offset generator 812 with the input impedance of amplifier 806. In some embodiments, offset generator 812 applies a signal (e.g., a voltage) that, when applied to offset resistor 814, generates an offset current that is equal and opposite to the baseline touch signal from touch panel 801 (e.g., $I_{BASE}$, the signal generated by touch panel 801 due to stimulation source 802 when there is no touch or hover activity). In some embodiments, injecting a signal that is equal and opposite to the baseline touch signal from touch panel 801 into the noninverting input port of amplifier 806 offsets or "cancels out" the touch signal resulting from the baseline capacitance, leaving the touch signal resulting from a touch or hover interaction (e.g., $I_{TOUCH}$). In some embodiments, the signal generated by offset generator 812 is a large percentage of the baseline touch signal (e.g., a percentage greater than or equal to 50% of the baseline touch signal) and is able to cancel out the large percentage of the baseline touch signal.

In some embodiments, cancelling a large percentage of the baseline touch signal decreases the proportion of the overall touch signal due to the baseline capacitance and thus increases the proportion of the overall touch signal due to the touch or hover activity. In some embodiments, increasing the ratio of the signal due to the touch or hover activity to the overall touch signal increases the system's sensitivity and ability to identify touch and hover events. In some examples, offset generator 812 decreases touch signal drift. In some examples, the baseline touch signal (e.g. touch signal in the absence of touch) induces a touch baseline drift component, which is optionally equivalent to the product of the temperature coefficient of the touch sensing circuitry, the temperature of the touch sensing circuitry, and/or the baseline touch signal. In some examples, by performing offset compensation (e.g., by cancelling the baseline touch component via offset generator 812), the associated touch baseline drift component can be eliminated or reduced and thus the associated touch baseline drift can be eliminated or reduced.

In some embodiments, the circuit generated by the combination of capacitor 804, amplifier 806, feedback capacitor 808, and feedback resistor 810 forms a differentiator that performs a derivative function on the stimulation signal. In some embodiments (such as those illustrated in FIGS. 8A-8B), the amplifier's feedback network impedance is dominated by $R_{FB}$ and therefore, the amplifier is configured in transimpedance mode. Thus, in some embodiments, the signal generated by offset generator 812 can have a waveform that is the same or similar to the derived waveform of the stimulation signal generated by stimulation source 802.

Figure 9A:
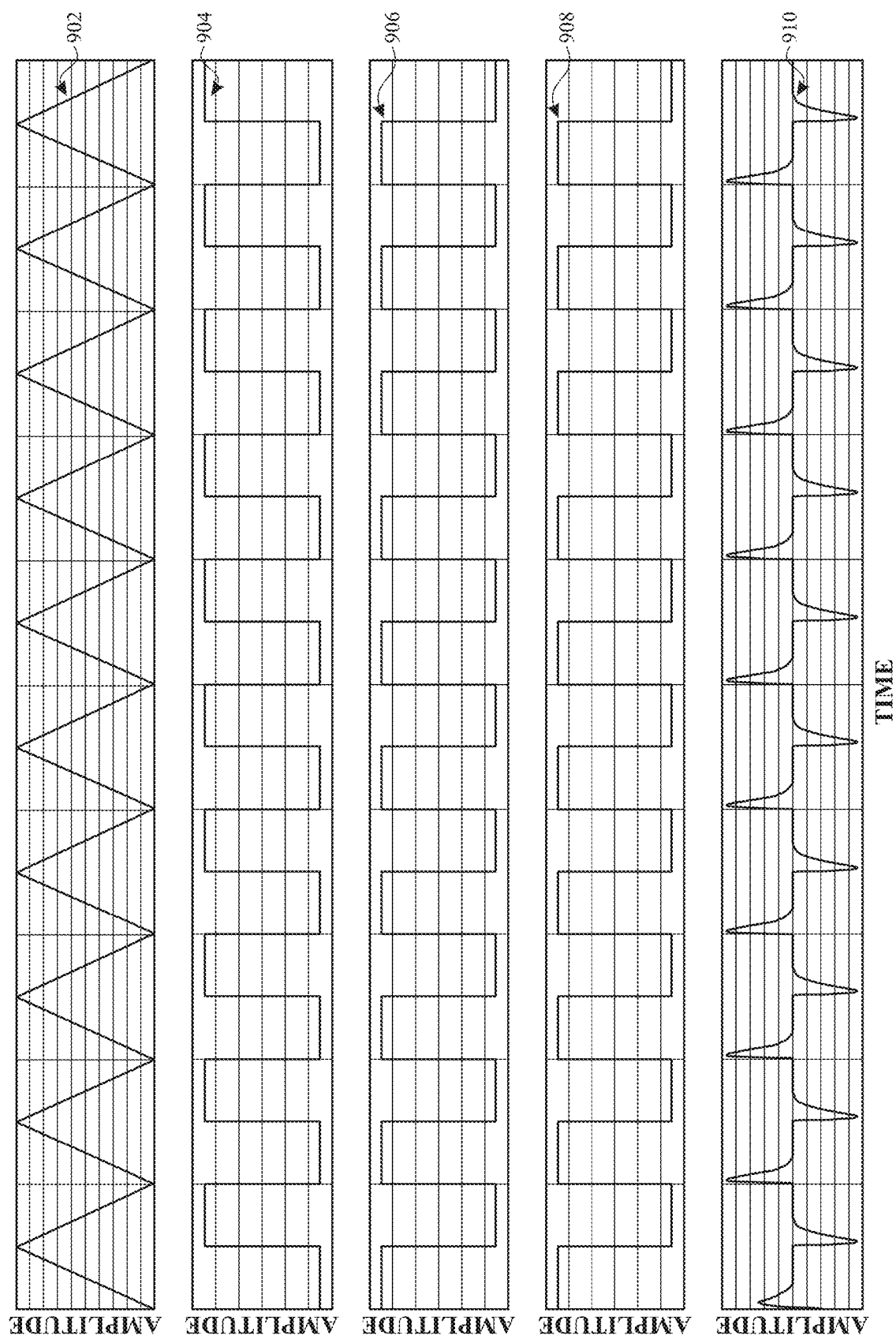
FIGS. 9A-9B illustrate signal graphs of exemplary driving schemes for touch sensor circuits according to examples of the disclosure.

For example, FIG. 9A illustrates signal graphs of an example driving scheme for exemplary touch sensor circuit 800 according to examples of the disclosure. In FIG. 9A, stimulation source 802 generates a triangular wave stimulation signal (e.g., signal 902). In some embodiments, driving capacitor 804 with a triangular wave causes a square wave output current profile, as shown by signal 904. In some embodiments, the current output of capacitor 804 is a square wave due to the touch sensor circuit forming a differentiator. In some examples, the output current can be modeled with equation (6):

$$I_C(t) = C_{SIG} \cdot \frac{dV(t)}{dt} \qquad (6)$$

where V(t) is the stimulation signal (e.g., signal 902) generated by stimulation source 802, $C_{SIG}$ is the capacitance of capacitor 804, and $I_C(t)$ is the output current (e.g., $I_{IN}$). In some embodiments, triangular stimulation signal V(t) can have the form:

$$V(t)=V\text{stm}_0 \cdot 2 \cdot F_{STM} \cdot t \qquad (7)$$

during time period t=0 to $$t = \frac{1}{2 \cdot F_{STM}},$$

where $F_{STM}$ is the frequency of the stimulation signal and Vstm0 is the amplitude of stimulation signal Vstm. In some embodiments, triangular stimulation signal V(t) can have the form:

$$V(t)=2 \cdot V\text{stm}_0 \cdot (1-F_{STM} \cdot t) \qquad (8)$$

during time period $$t = \frac{1}{2 \cdot F_{STM}} \text{ to } t = \frac{1}{F_{STM}}.$$

Thus, in some embodiments, during the first time period (e.g., t=0 to $$t = \frac{1}{2 \cdot F_{STM}}),$$

the input current into the amplifier can be derived from equation (7) (e.g., by differentiating equation (7)) to yield equation (9):

$$I(t)=C_{SIG} \cdot V\text{stm}_0 \cdot 2 \cdot F_{STM} \qquad (9)$$

and during the second time period, the input current into the amplifier can derived from equation (8) (e.g., by differentiating equation (8) to yield equation (10):

$$I(t)=-C_{SIG} \cdot V\text{stm}_0 \cdot 2 \cdot F_{STM} \qquad (10)$$

In some embodiments, when the amplifier is configured in a TIA mode (e.g., if $R_{FB}$ dominates the feedback impedance), during the first time period (e.g., t=0 to $$t = \frac{1}{2 \cdot F_{STM}}),$$

the output of the amplifier can be modeled by equation (11):

$$V_{OUT}(t) = R_{FB} \cdot C_{SIG} \cdot Vstm_0 \cdot 2 \cdot F_{STM} \quad (12)$$

and during the second time period the output of the amplifier can be modeled by equation (12):

$$V_{OUT}(t) = -R_{FB} \cdot C_{SIG} \cdot Vstm_0 \cdot 2 \cdot F_{STM} \quad (12)$$

As shown, providing a triangular stimulation signal results in a square current signal that is based on the slope of the triangle signal as described above. In some examples, signal 902 includes a baseline current component, $I_{BASE}$, and touch current component, $I_{TOUCH}$. In some examples, the touch current component can be significant smaller than the baseline current component (e.g., small perturbations to signal 902 which are not perceptible due to the scale of the graph).

As shown in FIG. 9A, because touch sensor circuit 800 uses an offset resistor 814 with offset generator 812, touch sensor circuit 800 does not form a differentiator with offset generator 812. Thus, generating a square wave voltage signal (e.g., signal 906) causes a square wave current signal (e.g., signal 908) to be injected into amplifier 806. In some embodiments, offset resistor 814 can be selected (e.g., adjusted, tuned, etc.) to improve the cancellation (e.g., cancellation of the baseline touch signal as described above) based on equation (13):

$$|C_{SIG} \cdot Vstm_0 \cdot 2 \cdot F_{STM}| = \frac{V_{off_0}}{\frac{2}{R_{OFF}}} \quad (13)$$

where $V_{off_0}$ is the amplitude of offset signal (e.g., generated by offset generator 832).

In some examples, because signal 908 (e.g., the current injected by offset generator 812) has a similar or the same signal profile as signal 904 (e.g., the current output from touch panel 802, the current flowing through capacitor 804) and has a similar or the same amplitude as the baseline current component ($I_{BASE}$) of signal 904, the resulting current flowing into the inverting input of amplifier 806 includes the signal due to touch or hover activity ($I_{TOUCH}$) and little or none of the baseline current component, $I_{BASE}$, which has been cancelled out or reduced by signal 908. Thus, the resulting output signal of amplifier 806 is an amplified signal based on $I_{TOUCH}$, as illustrated by signal 910. In some embodiments, as illustrated by signal 910, the output signal has peaks and valleys (e.g., due to the sudden change in input current at the transitions and/or due to any phase misalignment between signals 904 and 908). In some embodiments, the output signal can be sampled on each cycle after the signal has settled to a steady state (e.g., after the peaks and valleys). In some embodiments, the output signal can be sampled on each cycle before the half cycle (e.g., before the next peak or valley).

FIG. 8B illustrates an exemplary touch sensor circuit 820 according to examples of the disclosure. Touch sensor circuit 820 is similar to touch sensor circuit 800 except instead of an offset resistor coupling offset generator 812 to the inverting input of amplifier 806, touch sensor circuit 820 includes an offset capacitor 834 coupling offset generator 832 to the inverting input of amplifier 826. In some embodiments, offset capacitor 834 is a variable capacitor. In some embodiments, the use of offset capacitor 834 instead of an offset resistor causes touch sensor circuit 820 to form a differentiator that performs a derivative function on the offset signal. Thus, in some embodiments, in order to generate a current of equal but opposite magnitude as the current through capacitor 824, the signal generated by offset generator 832 can have a waveform that is the same or similar to the waveform of the stimulation signal generated by stimulation source 832 (e.g., not the derived waveform of the stimulation signal). For example, if the stimulation signal generated by stimulation source 822 is a triangular wave, then the waveform generated by offset generator 832 is also a triangular wave. In some embodiments, offset capacitor 834 can be set have the same baseline capacitance as capacitor 824 and offset generator 832 can be set to generate the same signal (but opposite) as signal generator 822. In some embodiments, instead of using a separate offset generator 812, touch sensor circuit 820 can include an inverter that receives the stimulation signal from stimulation source 822, inverts the stimulation signal, and drives offset capacitor 834 with the inverted version of the stimulation signal. In some embodiments, using offset capacitor 834 (e.g., as opposed to offset resistor 814) can be advantageous over using an offset resistor 814 because on-chip capacitors (e.g., integrated capacitors) have lower temperature coefficients than on-chip resistors.

Figure 9B:
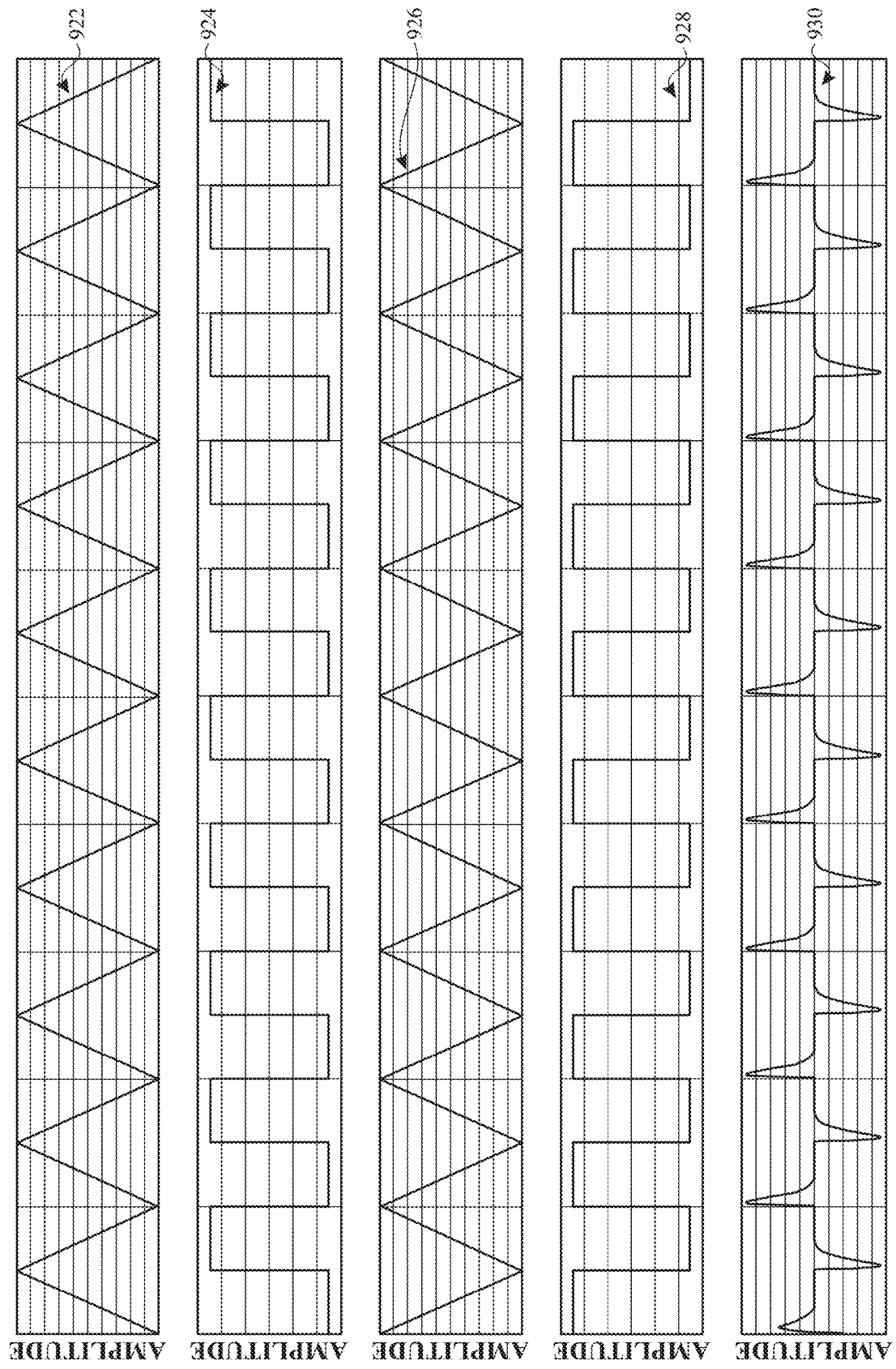

FIG. 9B illustrates signal graphs of an example driving scheme for exemplary touch sensor circuit 820 according to examples of the disclosure. In FIG. 9B, stimulation source 822 generates a triangular wave stimulation signal (e.g., signal 922). In some embodiments, driving capacitor 824 with a triangular wave causes a square wave output current profile, as shown by signal 924. In some embodiments, the current output of capacitor 824 is a square wave due to the touch sensor circuit forming a differentiator. In some examples, the output current can be modeled with equation (6) above.

In some examples, signal 922 includes a baseline current component, $I_{BASE}$, and touch current component, $I_{TOUCH}$. In some examples, the touch current component can be significant smaller than the baseline current component.

As shown in FIG. 9B, because touch sensor circuit 820 uses an offset capacitor 834 with offset generator 832, touch sensor circuit 820 forms a differentiator with offset generator 832. Thus, generating a triangle wave voltage signal (e.g., signal 926) causes a square wave current signal (e.g., signal 928) to be injected into amplifier 826.

In some examples, because signal 928 (e.g., the current injected by offset generator 832) has a similar or the same signal profile as signal 924 (e.g., the current output from touch panel 822, the current flowing through capacitor 824) and has a similar or the same amplitude as the baseline current component ($I_{BASE}$) of signal 924, the resulting current flowing into the inverting input of amplifier 826 includes the signal due to touch or hover activity ($I_{TOUCH}$) and little or none of the baseline current component, $I_{BASE}$, which has been cancelled out or reduced by signal 902. Thus, the resulting output signal of amplifier 826 is an amplified signal based on $I_{TOUCH}$, as illustrated by signal 930. In some embodiments, as illustrated by signal 930, the output signal has peaks and valleys (e.g., due to the sudden change in input current at the transitions and/or due to any phase misalignment between signals 924 and 928) and a finite panel bandwidth. In some embodiments, the output signal can be sampled on each cycle after the signal has settled to a steady state (e.g., after the peaks and valleys). In some embodiments, the output signal can be sampled on each cycle before the half cycle (e.g., before the next peak or valley).

Figure 10A:
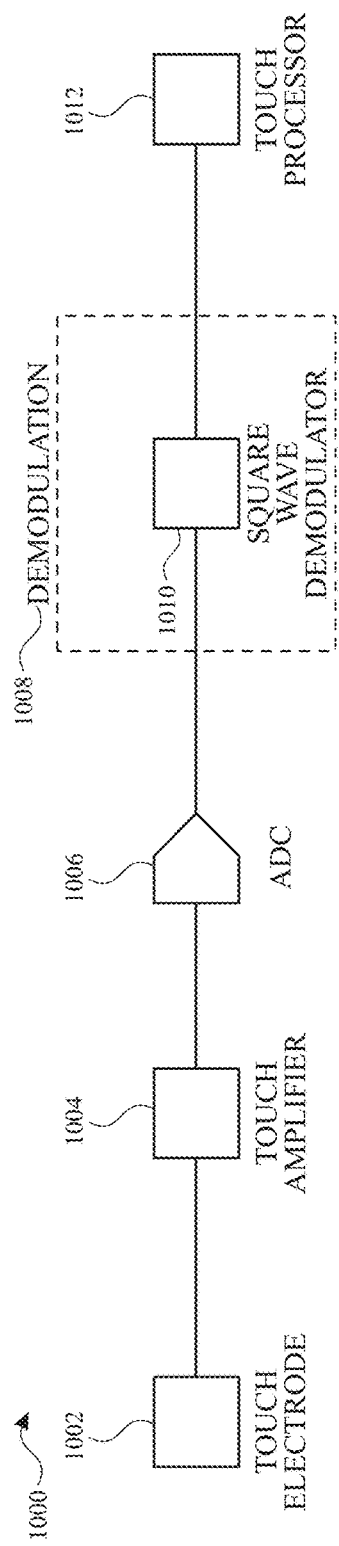
FIGS. 10A-10C illustrate a method of demodulating a touch sense signal.
Figure 10B:
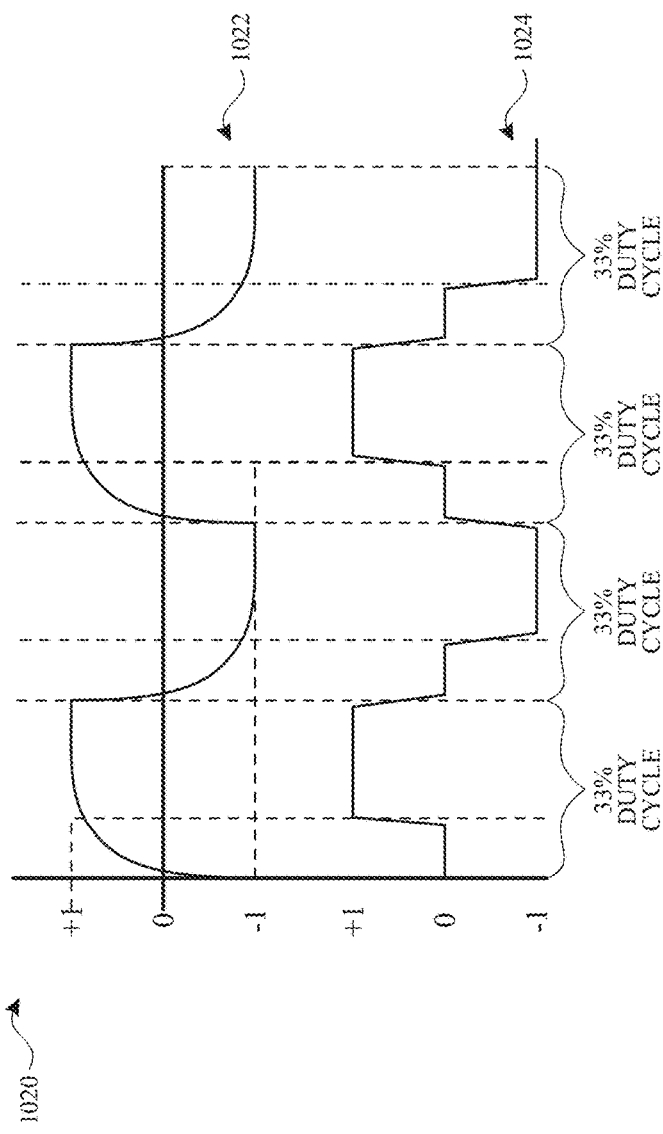
Figure 10C:
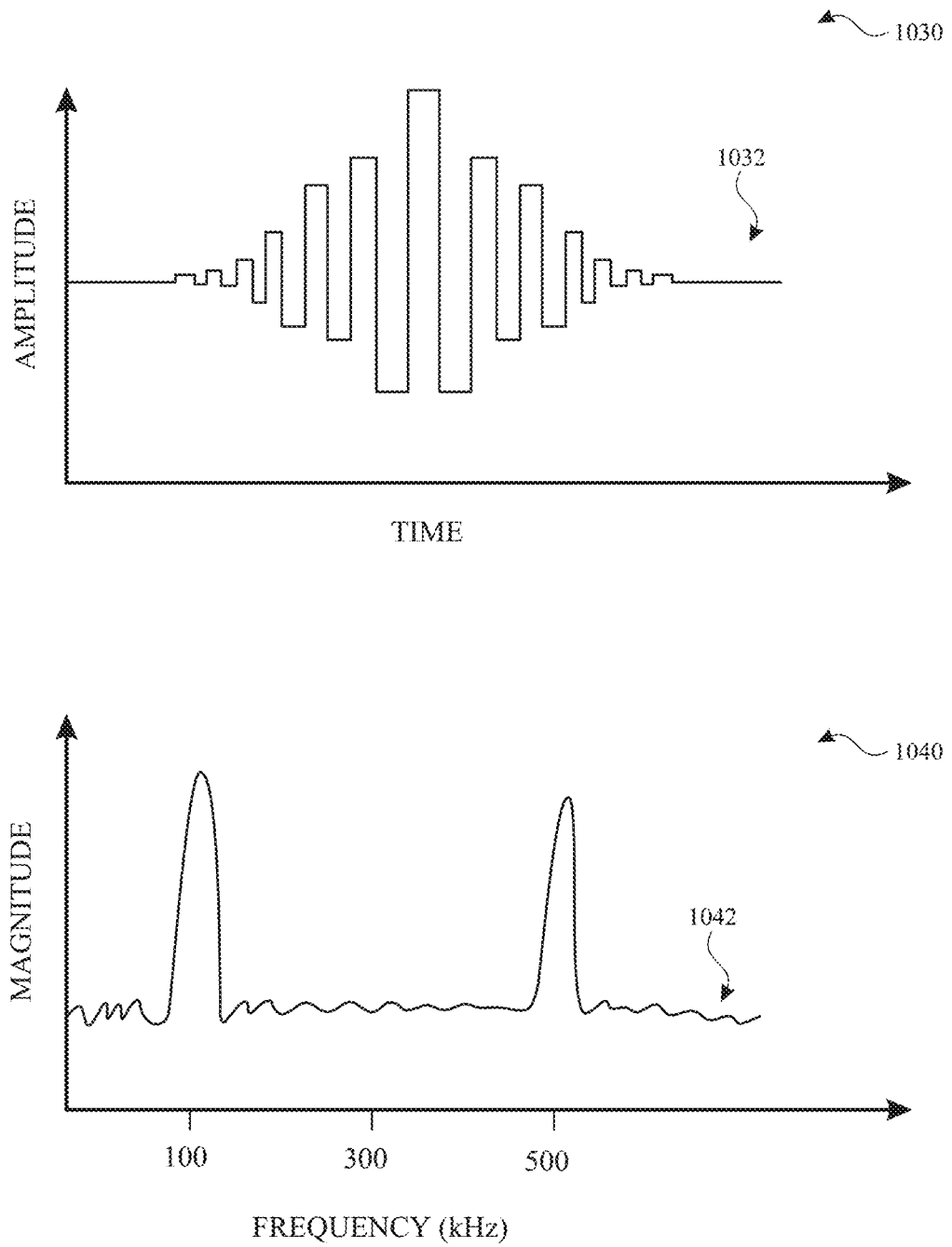

FIGS. 10A-10C illustrate a method of demodulating a touch sense signal. In some examples, the output signal of a touch sensor circuit (e.g., such as the touch sensor circuits described above) are further post processed before the signal is analyzed to determine whether or what type of touch activity occurred. In some examples, the post processing includes demodulating the touch sense signal. In some examples, the touch sense signal is converted to a digital signal before demodulation. In some examples, as will be described in further detail, demodulation includes multiplying the touch sense signal with one or more demodulation waveforms (e.g., predetermined waveforms that, when multiplied with the touch sense signal, performs one or more demodulation functions on the touch sense signal).

FIG. 10A illustrates an exemplary block diagram of a touch sensing system 1000. In some examples, touch sensing system 1000 includes touch electrode 1002 (e.g., such as touch node 422, touch electrode 604, touch electrode 606, row electrodes 702, and/or column electrodes 706 described above) that generates one or more touch sense signals indicative of touch activity detected on a touch panel. It is understood that touch electrode 1002 can represent a single touch electrode or a combination of multiple touch electrodes.

In FIG. 10A, touch electrode 1002 is coupled to touch amplifier 1004, which amplifies the output signal from touch electrode 1002 and optionally performs one or more preliminary filtering or post-processing steps (e.g., such as described above with respect to FIGS. 8A-8B). In some examples, touch sensing system 1000 includes an analog-to-digital converter 1006. Analog-to-digital converter 1006 can convert the analog output signal from amplifier 1004 into a digital signal representative of the amplified analog touch signal.

The touch sensing system 1000 in FIG. 10A includes demodulation block 1008. Demodulation block 808 can perform one or more demodulation functions on the digitized touch signal. In some embodiments, demodulation block 1008 includes one or more multipliers that multiplies the digitized touch signal with one or more demodulation waveforms. The demodulation waveforms can be selected and/or designed to perform particular demodulation functions. For example, demodulation block 808 includes a square wave demodulator that filters the touch signal and generates a "squared" output signal (e.g., a signal in which the transitions are short and the steady state levels (the peaks and troughs) are relatively flat). Thus, a square wave demodulator can be used to clean up the touch signal that is conducive to better sampling of the touch signal.

In FIG. 10A, demodulation block 1008 includes multiplier 1010, multiplier 1011, and integrator 1013. As illustrated in FIG. 10A, multiplier 1010 can multiply the touch signal with a square wave demodulation waveform, multiplier 1011 can multiply the touch signal with a window waveform, and integrator 1013 can perform an integrating function on the touch signal (e.g., integrates the touch signal over a threshold period and outputs a value representative of the integral of the touch signal over the threshold period). It is understood that although FIG. 10A illustrates demodulation block 1008 including multiplier 1010 and multiplier 101, other multipliers can be additionally included in demodulation block 1008 for performing other functions. For example, demodulation block 1008 can include a multi-stimulation demodulator (e.g., a demodulator that decodes the multi-stimulation codes, such as those described above). It is also understood that certain functions can be combined. For example, a windowing function can be combined with the square wave demodulator.

Multiplier 1010 can multiply the touch signal with a gated square wave demodulation waveform (e.g., as opposed to an ungated square wave demodulation waveform), which performs a gated square wave demodulation function on the touch signal. A gated square wave demodulation can perform a square wave demodulation function (e.g., "squaring" the touch signal as described above), and a gating function. Performing a gating function can include applying a square wave demodulation waveform with certain portions of the square wave demodulation waveform zeroed out (e.g., as will be illustrated below in FIG. 10B). In some examples, the zeroed portions of the demodulation waveform zeroes out the respective portions of the touch signal. Configuring the demodulation waveform such that the zeroed portion aligns with the transitions in the touch signal (e.g., the transitions of the carrier waveform generated by the stimulation voltage source, such as stimulation sources 802 and 822) can eliminate (e.g., zero out) or reduce the transition periods in which the touch signal has not yet settled.

In some examples, gating the touch signal (e.g., performing the gating function described above) provides one or more benefits. One benefit includes reducing the touch signal drift by eliminating and/or reducing the unsettled portions of the touch signal (e.g., before the touch signal has reached 80%, 85%, 90%, 95%, 99% of the peak value, and/or the first 10%, 20%, 30%, 33% of the pulse), which is potentially more susceptible to temperature drift. Another benefit includes optimizing and/or improving the interference rejection of the demodulator. For example, the frequency response of a square wave demodulator is equivalent to the fast Fourier transform (FFT) of a square wave demodulation waveform. The FFT of the square wave demodulation waveform has a passband at the at the fundamental frequency of the square wave demodulation waveform and at the odd harmonics (e.g., $3^{rd}$, $5^{th}$, etc.). In some examples, setting the duty cycle of the gating (e.g., the duty cycle of the square wave) to 33% (e.g., ⅓ of the waveform is zero) causes the third harmonic to be eliminated, thus reducing the amount of interference that is coupled through the demodulator at the frequency of the third harmonic and improves the interference rejection. It is understood that the duty cycle can be set to any value and the frequency response of the demodulator can be adjusted accordingly.

In some examples, additionally or alternatively, multiplier 1011 multiplies the touch signal with a window waveform, which performs a windowing function on the touch signal. A window waveform generally tapers to zero outside of a predetermined window of time, peaks at the center of the waveform, is symmetric before and after the peak of the waveform. Examples of suitable window waveforms include a Taylor window, a Gaussian window, a Chebyshev window (e.g., a Dolph-Chebyshev window), etc. Other suitable window functions are possible.

In some examples, a window function can be applied to optimize and/or improve the filter properties of the demodulator, and/or optionally improving interference rejection. The filter properties that can be optimized and/or improved include the stop band attenuation, passband ripple, stopband ripple, stop band roll-off, filter bandwidth, roll-off and/or any other suitable filter properties. Applying a windowing function to the touch signal can apply a stop-band filtering function to the touch signal. In some examples, the windowing function is able to reduce or eliminate noise at certain frequencies while maintaining the touch signal frequencies (e.g., the fundamental frequency, for example). Thus, applying a windowed demodulation function can perform stop-band attenuation. The windowing function can also be configured to attenuate frequencies between the harmonics of the touch signal (e.g., first harmonic, fifth harmonic, etc.).

In some examples, after performing the one or more demodulation steps, the demodulated touch signal is integrated by integrator 1013. Integrator 1013 can integrate the demodulated touch signal over a period of time and outputs a representative output value. In some embodiments, the output of integrator 1013 is forwarded to touch processor 1012 (e.g., touch processor 202) for processing (e.g., to determine whether there was touch activity and respond accordingly). It is understood that additional multipliers and/or integrators can be included in demodulation block 1008 for performing other post-processing functions on the touch signal.

FIG. 10B illustrates signal graphs of an exemplary demodulation module according to examples of the disclosure. In FIG. 10B, touch amplifier 1004 (optionally analog-to-digital converter 1006) outputs signal 1022 corresponding to a touch signal. As shown, signal 1022 has a shark fin shape (e.g., a square wave with an extended rise and fall transition) with a rise and fall time based on the characteristics of the touch sensing circuit. As discussed above, signal 1022 transitions from negative to positive and positive to negative over a certain period of time. In some examples, while signal 1022 is transitioning, energy (e.g., electrical energy) is being transferred from touch amplifier 804 to downstream circuitry. In some examples, as signal 1022 approaches and/or reaches its steady state, the majority of energy has been transferred to the downstream circuitry and signal 1022 begins to settle. Thus, as discussed above, square wave demodulation waveform (e.g., such as described above in FIG. 10A, represented by signal 1024) can be configured to gate (e.g., zero out) signal 1022 during the initial transition period (e.g., first 10%, 20%, 25%, 33%, 40%, of a pulse) and to not gate (e.g., pass through, using a 1 multiplier) as signal 1022 approaches and/or reaches its steady state level (e.g., 80%, 85%, 90%, 95%, 99% of the steady state level).

As described above, signal 1024 has a value of zero during the initial ⅓ of the width of the positive pulse of signal 1022 and a value of 1 during the subsequent ⅔ of the width of the positive pulse of signal 1022. Thus, signal 1024 gates the initial ⅓ of the positive pulse of signal 1022 and passes through the subsequent ⅔ of the width of the positive pulse of signal 1022. On the negative pulse, signal 1024 is zero for the first third of the negative pulse and −1 during the subsequent ⅔ of the width of the negative pulse of signal 1022. Thus, signal 1024 gates the initial ⅓ of the negative pulse of signal 1022 and passes through the subsequent ⅔ of the width of the negative pulse of signal 1022.

FIG. 10C illustrates graph 1030 and graph 1040 that illustrate an exemplary windowed gated square wave demodulation waveform and an exemplary frequency domain graph of the touch signal multiplied by a windowed gated square wave demodulation waveform. Graph 1030 is a time domain graph (e.g., amplitude against time) that includes signal 1032 that represents an exemplary window waveform (e.g., such as described above in FIG. 10A). In some embodiments, signal 1032 is the waveform of a windowed gated square wave demodulator (e.g., combining the window waveform with the gated square wave demodulation waveform). As shown, signal 1032 is a square wave waveform that increases in amplitude from zero, reaches a peak amplitude, and then reduces in amplitude (optionally symmetrically) to zero. In some examples, signal 1032 has a Taylor window waveform. As described above, multiplying a touch signal (e.g., such as signal 1022) with signal 1032 can result in a signal with frequency domain signal 1042. As shown in FIG. 10C, signal 1042 is a frequency domain graph (e.g., magnitude against frequency) of the touch signal after being demodulated by a windowed gated square wave demodulation waveform (e.g., such as signal 1032). In some examples, signal 1042 has a peak at 100 kHz (e.g., the first harmonic, the fundamental frequency) of the touch signal and at 500 kHz (e.g., the fifth harmonic of the touch signal). As shown, the third harmonic (e.g., at 300 kHz) has been eliminated (optionally reduced) because the demodulation waveform has a 33% duty cycle, which eliminates or reduces the third harmonic of the touch signal. Thus, as shown in FIG. 10C, applying a windowed gated square wave demodulation waveform (e.g., as opposed to one that is not windowed) applies a bandpass filtering effect in which 100 kHz and 500 kHz are passed through (or only minimally attenuated) while the frequencies other than the 100 kHz and 500 kHz are attenuated. It is understood that the windowing illustrated in signal 1032 is merely illustrative and can be modified to provide the transfer function desired according to the characteristics of the frequency spectrum of the touch signal. It is also understood that the reference to the first, third, and fifth harmonics at 100 kHz, 300 kHz, and 500 kHz is merely exemplary and any suitable frequency is possible.

It is understood that the demodulation technique described here (e.g., the use of a square wave demodulator, the user of a gated square wave demodulator, and/or the use of a windowed gated square wave demodulator) can be combined with any of the techniques described above (e.g., the driving and sensing patterns described in FIGS. 6 and 7A-7D, the multi-stimulation technique described with respect to Table 3, and/or the baseline offset techniques described with respect to FIGS. 8A-8B and 9A-9B).

Accordingly, some examples of this disclosure describe a method. Additionally or alternatively, in some examples, additionally or alternatively, the method is performed at a touch sensor panel having a first plurality of electrodes electrically coupled together along a first direction and a second plurality of electrodes electrically coupled together along a second direction, different from the first direction. Additionally or alternatively, in some embodiments, the method includes, during a first time period, driving a first set of electrodes of the first plurality of electrodes. Additionally or alternatively, in some embodiments, the method includes, while driving the first set of electrodes, sensing a second set of electrodes of the first plurality of electrodes, wherein the second set of electrodes are different from the first set of electrodes.

Additionally or alternatively, in some examples, the first set of electrodes includes a first electrode, and the second set of electrodes includes a second electrode, adjacent to the first electrode. Additionally or alternatively, in some examples, the first set of electrodes comprises a first electrode. Additionally or alternatively, in some examples, the second set of electrodes comprises a plurality of electrodes other than the first electrode. Additionally or alternatively, in some examples, the first set of electrodes includes a first electrode and a second electrode. Additionally or alternatively, in some examples, the second set of electrodes includes a third electrode and a fourth electrode. Additionally or alternatively, in some examples, the third electrode is adjacent to the first electrode and the second electrode.

Additionally or alternatively, in some examples, the second electrode is adjacent to the third electrode and the fourth electrode.

Additionally or alternatively, in some examples, the method includes, during the first time period, while driving the first set of electrodes and sensing the second set of electrodes, driving the second plurality of electrodes. Additionally or alternatively, in some examples, the method includes, during a second time period, after the first time period, driving the second set of electrodes and while driving the second set of electrodes, sensing the first set of electrodes.

Additionally or alternatively, in some examples, the method includes, during a third time period, different from the second time period and after the first time period, driving a first set of electrodes of the second plurality of electrodes. Additionally or alternatively, in some examples, the method includes, while driving the first set of electrodes of the second plurality of electrodes, sensing a second set of electrodes of the second plurality of electrodes, different from the first set of the second plurality of electrodes and driving the first plurality of electrodes.

Additionally or alternatively, in some examples, the method includes, during a fourth time period, different from the second and third time period and after the first time period, driving the second set of electrodes of the second plurality of electrodes. Additionally or alternatively, in some examples, the method includes, while driving the second set of electrodes of the second plurality of electrodes, sensing the first set of electrodes of the second plurality of electrodes and driving the first plurality of electrodes. Additionally or alternatively, in some examples, the method includes generating a touch image based on a sensed touch data from the first time period, the second time period, the third time period, and the fourth time period.

Some examples of the disclosure are directed to a non-transitory computer readable storage medium. The non-transitory computer readable storage medium can store instructions, which when executed by a device including one or more processors, can cause the device to perform any of the above methods.

Some examples of this disclosure describe a touch controller. Additionally or alternatively, in some examples, the touch controller includes a touch sensor panel having a first plurality of electrodes electrically coupled together along a first direction and a second plurality of electrodes electrically coupled together along a second direction, different from the first direction. Additionally or alternatively, in some examples, switching circuitry coupled to the first plurality of electrodes and the second plurality of electrodes and including a first set of switching circuits and a second set of switching circuits. Additionally or alternatively, in some examples, each switching circuit of the first set of switching circuits is coupled to a respective electrode of the first plurality of electrodes and is configured to selectively couple the respective electrode to a drive circuitry or a sense circuitry. Additionally or alternatively, in some examples, each switching circuit of the second set of switching circuits is coupled to a respective electrode of the second plurality of electrodes and is configured to selectively couple the respective electrode to the drive circuitry or the sense circuitry. Additionally or alternatively, in some examples, the touch controller is configured to, during a first time period, drive a first set of electrodes of the first plurality of electrodes and while driving the first set of electrodes, sense a second set of electrodes of the first plurality of electrodes, different from the first set of electrodes.

Additionally or alternatively, in some examples, driving the first set of electrodes includes configuring a first set of respective switching circuits corresponding to the first set of electrodes to couple the first set of electrodes to the drive circuitry. Additionally or alternatively, in some examples, sensing the second set of electrodes includes configuring a second set of respective switching circuits corresponding to the second set of electrodes to couple the second set of electrodes to the sense circuitry.

Additionally or alternatively, in some examples, the first set of electrodes includes a first electrode, and the second set of electrodes includes a second electrode, adjacent to the first electrode. Additionally or alternatively, in some examples, the first set of electrodes comprises a first electrode of the first plurality of electrodes. Additionally or alternatively, in some examples, the second set of electrodes comprises a plurality of electrodes other than the first electrode.

Additionally or alternatively, in some examples, the first set of electrodes includes a first electrode and a second electrode. Additionally or alternatively, in some examples, the second set of electrodes includes a third electrode and a fourth electrode. Additionally or alternatively, in some examples, the third electrode is adjacent to the first electrode and the second electrode. Additionally or alternatively, in some examples, the second electrode is adjacent to the third electrode and the fourth electrode. Additionally or alternatively, in some examples, the touch controller is configured to, during the first time period, while driving the first set of electrodes and sensing the second set of electrodes, drive the second plurality of electrodes.

Additionally or alternatively, in some examples, the touch controller is configured to, during a second time period, after the first time period, drive the second set of electrodes and while driving the second set of electrodes, sense the first set of electrodes. Additionally or alternatively, in some examples, the touch controller is configured to, during a third time period, different from the second time period and after the first time period, drive a first set of electrodes of the second plurality of electrodes. Additionally or alternatively, in some examples, the touch controller is configured to, during a third time period, different from the second time period and after the first time period, while driving the first set of electrodes of the second plurality of electrodes, sense a second set of electrodes of the second plurality of electrodes, different from the first set of the second plurality of electrodes and drive the first plurality of electrodes.

Additionally or alternatively, in some examples, the touch controller is configured to, drive the second set of electrodes of the second plurality of electrodes and while driving the second set of electrodes of the second plurality of electrodes, sense the first set of electrodes of the second plurality of electrodes and drive the first plurality of electrodes. Additionally or alternatively, in some examples, the touch controller is configured to generate a touch image based on a sensed touch data from the first time period, the second time period, the third time period, and the fourth time period.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method comprising:
at a touch sensor panel having a first plurality of electrodes electrically coupled together along a first direction and a second plurality of electrodes electrically coupled together along a second direction, different from the first direction:
during a first time period:
applying a drive signal to a first set of electrodes of the first plurality of electrodes corresponding to a set of odd electrodes of the first plurality of electrodes, wherein the first set of electrodes includes a first electrode and a second electrode; and
while applying the drive signal to the first set of electrodes:
sensing a second set of electrodes of the first plurality of electrodes corresponding to a set of even electrodes of the first plurality of electrodes; and
applying the drive signal to the second plurality of electrodes, wherein:
the second set of electrodes is different from the first set of electrodes;
the second set of electrodes includes a third electrode and a fourth electrode;
the third electrode is positioned between the first electrode and the second electrode absent intervening electrodes; and
the second electrode is positioned between the third electrode and the fourth electrode absent intervening electrodes.

2. The method of claim 1, further comprising:
during a second time period, after the first time period:
applying the drive signal to the second set of electrodes; and
while applying the drive signal to the second set of electrodes, sensing the first set of electrodes.

3. The method of claim 2, further comprising:
during a third time period, different from the second time period and after the first time period:
applying the drive signal to a first set of electrodes of the second plurality of electrodes; and
while applying the drive signal to the first set of electrodes of the second plurality of electrodes:
sensing a second set of electrodes of the second plurality of electrodes, different from the first set of the second plurality of electrodes; and
applying the drive signal to the first plurality of electrodes.

4. The method of claim 3, further comprising:
during a fourth time period, different from the second and third time period and after the first time period:
applying the drive signal to the second set of electrodes of the second plurality of electrodes; and
while applying the drive signal to the second set of electrodes of the second plurality of electrodes:
sensing the first set of electrodes of the second plurality of electrodes; and
applying the drive signal to the first plurality of electrodes.

5. The method of claim 4, further comprising generating a touch image based on a sensed touch data from the first time period, the second time period, the third time period, and the fourth time period.

6. A touch controller, comprising:
a touch sensor panel having a first plurality of electrodes electrically coupled together along a first direction and a second plurality of electrodes electrically coupled together along a second direction, different from the first direction;
switching circuitry coupled to the first plurality of electrodes and the second plurality of electrodes and including a first set of switching circuits and a second set of switching circuits, wherein:
each switching circuit of the first set of switching circuits is coupled to a respective electrode of the first plurality of electrodes and is configured to selectively couple the respective electrode to a drive circuitry or a sense circuitry; and
each switching circuit of the second set of switching circuits is coupled to a respective electrode of the second plurality of electrodes and is configured to selectively couple the respective electrode to the drive circuitry or the sense circuitry; and wherein:
the touch controller is configured to:
during a first time period:
apply a drive signal to a first set of electrodes of the first plurality of electrodes corresponding to a set of odd electrodes of the first plurality of electrodes, wherein the first set of electrodes includes a first electrode and a second electrode; and
while applying the drive signal to the first set of electrodes:
sense a second set of electrodes of the first plurality of electrodes corresponding to a set of even electrodes of the first plurality of electrodes; and
apply the drive signal to the second plurality of electrodes, wherein:
the second set of electrodes is different from the first set of electrodes;
the second set of electrodes includes a third electrode and a fourth electrode;
the third electrode is positioned between the first electrode and the second electrode absent intervening electrodes; and
the second electrode is positioned between the third electrode and the fourth electrode absent intervening electrodes.

7. The touch controller of claim 6, wherein:
applying the drive signal to the first set of electrodes includes configuring a first set of respective switching circuits corresponding to the first set of electrodes to couple the first set of electrodes to the drive circuitry; and
sensing the second set of electrodes includes configuring a second set of respective switching circuits corresponding to the second set of electrodes to couple the second set of electrodes to the sense circuitry.

8. The touch controller of claim 6, wherein the touch controller is further configured to:
during a second time period, after the first time period:
apply the drive signal to the second set of electrodes; and
while applying the drive signal to the second set of electrodes, sense the first set of electrodes.

9. The touch controller of claim 8, wherein the touch controller is further configured to:
    during a third time period, different from the second time period and after the first time period:
        apply the drive signal to a first set of electrodes of the second plurality of electrodes; and
        while applying the drive signal to the first set of electrodes of the second plurality of electrodes:
            sense a second set of electrodes of the second plurality of electrodes, different from the first set of the second plurality of electrodes; and
            apply the drive signal to the first plurality of electrodes.

10. The touch controller of claim 9, wherein the touch controller is further configured to:
    during a fourth time period, different from the second and third time period and after the first time period:
        apply the drive signal to the second set of electrodes of the second plurality of electrodes; and
        while applying the drive signal to the second set of electrodes of the second plurality of electrodes:
            sense the first set of electrodes of the second plurality of electrodes; and
            apply the drive signal to the first plurality of electrodes.

11. The touch controller of claim 10, wherein the touch controller is further configured to generate a touch image based on a sensed touch data from the first time period, the second time period, the third time period, and the fourth time period.

12. A non-transitory computer-readable storage medium storing instructions, which when executed by an electronic device including one or more processors, cause the electronic device to:
    at a touch sensor panel having a first plurality of electrodes electrically coupled together along a first direction and a second plurality of electrodes electrically coupled together along a second direction, different from the first direction:
        during a first time period:
            apply a drive signal to a first set of electrodes of the first plurality of electrodes corresponding to a set of odd electrodes of the first plurality of electrodes, wherein the first set of electrodes includes a first electrode and a second electrode; and
            while applying the drive signal to the first set of electrodes:
                sense a second set of electrodes of the first plurality of electrodes corresponding to a set of even electrodes of the first plurality of electrodes; and
                apply the drive signal to the second plurality of electrodes, wherein:
                    the second set of electrodes is different from the first set of electrodes;
                    the second set of electrodes includes a third electrode and a fourth electrode;
                    the third electrode is positioned between the first electrode and the second electrode absent intervening electrodes; and
                    the second electrode is positioned between the third electrode and the fourth electrode absent intervening electrodes.

13. The non-transitory computer-readable storage medium of claim 12, wherein the instructions, when executed by the electronic device, further cause the electronic device to:
    during a second time period, after the first time period:
        apply the drive signal to the second set of electrodes; and
        while applying the drive signal to the second set of electrodes, sense the first set of electrodes.

14. The non-transitory computer-readable storage medium of claim 13, wherein the instructions, when executed by the electronic device, further cause the electronic device to:
    during a third time period, different from the second time period and after the first time period:
        apply the drive signal to a first set of electrodes of the second plurality of electrodes; and
        while applying the drive signal to the first set of electrodes of the second plurality of electrodes:
            sense a second set of electrodes of the second plurality of electrodes, different from the first set of the second plurality of electrodes; and
            apply the drive signal to the first plurality of electrodes.

15. The non-transitory computer-readable storage medium of claim 14, wherein the instructions, when executed by the electronic device, further cause the electronic device to:
    during a fourth time period, different from the second and third time period and after the first time period:
        apply the drive signal to the second set of electrodes of the second plurality of electrodes; and
        while applying the drive signal to the second set of electrodes of the second plurality of electrodes:
            sense the first set of electrodes of the second plurality of electrodes; and
            apply the drive signal to the first plurality of electrodes.

16. The non-transitory computer-readable storage medium of claim 15, wherein the instructions, when executed by the electronic device, further cause the electronic device to:
    generate a touch image based on a sensed touch data from the first time period, the second time period, the third time period, and the fourth time period.

17. The non-transitory computer-readable storage medium of claim 12, wherein the instructions, when executed by the electronic device, further cause the electronic device to:
    apply the drive signal to the first set of electrodes by configuring a first set of respective switching circuits corresponding to the first set of electrodes to couple the first set of electrodes to drive circuitry of the electronic device; and
    sense the second set of electrodes by configuring a second set of respective switching circuits corresponding to the second set of electrodes to couple the second set of electrodes to sense circuitry of the electronic device.

* * * * *